US009609534B2

(12) United States Patent
Ma et al.

(10) Patent No.: US 9,609,534 B2
(45) Date of Patent: Mar. 28, 2017

(54) METHOD, DEVICE AND USER EQUIPMENT FOR SENDING INDICATION INFORMATION, METHOD AND DEVICE FOR RECEIVING MULTIMEDIA BROADCAST MULTICAST SERVICE

(71) Applicant: ZTE Corporation, Shenzhen, Guandong Province (CN)

(72) Inventors: Zijiang Ma, Shenzhen (CN); Ding Ding, Shenzhen (CN); Hongjun Liu, Shenzhen (CN)

(73) Assignee: ZTE CORPORATION (CN)

( * ) Notice: Subject to any disclaimer, the term of this patent is extended or adjusted under 35 U.S.C. 154(b) by 210 days.

(21) Appl. No.: 14/165,277

(22) Filed: Jan. 27, 2014

(65) Prior Publication Data

US 2014/0140237 A1    May 22, 2014

Related U.S. Application Data

(63) Continuation-in-part of application No. PCT/CN2013/076738, filed on Jun. 4, 2013.

(30) Foreign Application Priority Data

Jun. 5, 2012   (CN) .......................... 2012 1 0182965

(51) Int. Cl.
*H04W 4/00* (2009.01)
*H04W 24/08* (2009.01)
(Continued)

(52) U.S. Cl.
CPC ........... *H04W 24/08* (2013.01); *H04W 4/021* (2013.01); *H04W 4/06* (2013.01); *H04W 8/20* (2013.01);
(Continued)

(58) Field of Classification Search
CPC ....... H04W 4/021; H04W 4/06; H04W 24/08; H04W 8/20; H04W 36/08; H04W 36/0033; H04W 36/0011; H04W 72/005
See application file for complete search history.

(56) References Cited

U.S. PATENT DOCUMENTS

2011/0305184 A1* 12/2011 Hsu ..................... H04L 65/4076
                                                    370/312
2012/0236776 A1*  9/2012 Zhang ................... H04W 48/12
                                                    370/312
(Continued)

FOREIGN PATENT DOCUMENTS

CN    102036180 A    4/2011
CN    102158809 A    8/2011
(Continued)

OTHER PUBLICATIONS

Supplementary European Search Report dated May 18, 2015 corresponding to EP Patent Application No. EP 13 79 9898.

*Primary Examiner* — Jutai Kao
(74) *Attorney, Agent, or Firm* — McAndrews, Held & Malloy, Ltd.

(57) ABSTRACT

Provided are a method, device and UE for sending indication information, and a method and device for receiving an MBMS. The method for sending indication information includes: UE determining that the UE has left one or more MBSFN areas which can carry a predetermined MBMS; the UE sending indication information to a network side. The method for receiving MBMS includes: UE receiving a specified MBMS which is carried in one or more MBSFN area to which a source cell where the UE is currently located belongs; after the UE performs cell reselection and resides in a target cell, in the case that one or more MBSFN areas to which the target cell belongs are different from one or more MBSFN areas to which the source cell belongs, the UE
(Continued)

acquiring a condition of one or more MBMSs which are carried in the one or more MBSFN areas to which the target cell belongs; and the UE continuing receiving the specified MBMS in the target cell according to the acquired MBMS condition.

19 Claims, 8 Drawing Sheets

(51) Int. Cl.
    *H04W 4/02*     (2009.01)
    *H04W 36/08*     (2009.01)
    *H04W 72/00*     (2009.01)
    *H04W 8/20*     (2009.01)
    *H04W 36/00*     (2009.01)
    *H04W 4/06*     (2009.01)

(52) U.S. Cl.
    CPC .... *H04W 36/0011* (2013.01); *H04W 36/0033* (2013.01); *H04W 36/08* (2013.01); *H04W 72/005* (2013.01)

(56) References Cited

U.S. PATENT DOCUMENTS

| | | | | |
|---|---|---|---|---|
| 2013/0035129 A1* | 2/2013 | Wei | ......................... | H04W 4/06 455/517 |
| 2014/0078923 A1* | 3/2014 | Guan | ...................... | H04W 4/06 370/252 |
| 2015/0163706 A1* | 6/2015 | Wang | ................ | H04W 36/0061 455/436 |

FOREIGN PATENT DOCUMENTS

| | | |
|---|---|---|
| CN | 102316418 A | 1/2012 |
| EP | 2302969 | 3/2011 |
| WO | 2008137354 | 11/2008 |

* cited by examiner

METHOD, DEVICE AND USER EQUIPMENT FOR SENDING INDICATION INFORMATION, METHOD AND DEVICE FOR RECEIVING MULTIMEDIA BROADCAST MULTICAST SERVICE

CROSS-REFERENCE TO RELATED APPLICATIONS

This application is a continuation-in-part (CIP) of International application No. PCT/CN2013/076738 filed Jun. 4, 2013 designating the U.S., among other countries. The International application (No. PCT/CN2013/076738) claims the benefit of and priority to Chinese Patent Application No. CN201210182965.8, filed on Jun. 5, 2012, which is incorporated by reference herein in its entirety.

TECHNICAL FIELD

The disclosure relates to the field of communications, and in particular to a method, device and user equipment for sending indication information, and a method and device for receiving a multimedia broadcast multicast service (MBMS).

BACKGROUND

Long-Term Evolution (LTE) is a next generation mobile broadband network standard defined by the Third Generation Partnership Project (3GPP). The Orthogonal Frequency Division Multiplexing (OFDM) technology is adopted in the LTE, and technologies such as Multiple Input Multiple Output (MIMO) are also introduced. In addition, the bandwidth of 1.25-20 MHZ can be supported, so that the peak data rate and the system capacity are greatly improved, specifically, the peak rate of 100 Mbit/S for downlink and 50 Mbit/s for uplink is supported under the bandwidth of 20 MHz. A flat network structure enhances the scheduling and the radio resource control efficiency, and shortens the continuous delay.

The MBMS service (MBMS for short) has been supported in the third generation mobile communication system, and an Enhanced Multimedia Broadcast Multicast Service (eM-BMS) being constructed in a fourth generation mobile communication LTE system is regarded as a service having a bright application prospect. The implementation manner is that an intelligent terminal having a video function receives a digital audio/video service in the form of broadcast/multicast through a Physical Downlink Multicast Channel (PMCH). As for the implementation of eMBMS and the networking mode thereof, 3GPP protocol standard gives a complete solution.

With the rapid development of Internet and the popularization of large screen terminals with multiple functions, a large number of mobile data multimedia services and various kinds of high bandwidth multimedia services appear, such as video conferences, television broadcasting, video on demand, advertisements, online education, interactive games, on the one hand, this meets the multi-service requirement of a mobile user, and on the other hand, this brings a new service growth point to mobile operators. These mobile data multimedia services require that multiple users can receive the same data at the same and have the features of large data volume, long time of duration, sensitive delay and the like compared with general data traffic.

In order to effectively utilize mobile network resources, 3GPP put forwards the MBMS which is a technology of transmitting data from a data source to multiple target mobile terminals so as to share internet (including a core network and an access network) resources and improve the utilization ratio of network resources (in particular to air interface resources). The MBMS defined by 3GPP not only can realize the multicast and broadcast of the message in plain text and low rate, also can improve the broadcast and multicast of a high-speed multimedia service so as to provide a variety of abundant video, audio, and multimedia services, thereby providing a better service prospect for the development of 3G.

User Equipment (UE) for receiving the MBMS can be in one of the two following status: one is a Radio Resource Control (RRC) connected state (RRC_CONNECTED); the other is an RRC idle state (RRC_IDLE). According to the fact that whether the UE is receiving a unicast service, it can be judged that whether the UE which is receiving an MBMS is in the connected state or in the idle state. Specifically, when the UE is receiving the unicast service, the UE is in the connected state. When the UE is in the idle state, an RRC connection is not established between the UE and the network side, and when the UE is in the connected state, an RRC connection is established between the UE and the network side.

If there is an MBMS that UE is receiving in a source cell (also referred to as a current cell), after the UE leaves the source cell and resides in a target cell (if the UE is in the connected mode, the UE can reside in the target cell from the source cell by a handover process, if the UE is in the idle mode, then the UE can reside in the target cell from the source cell through a cell selection/cell reselection process, wherein the above target cell also can be called a new cell), the UE will read messages (wherein an MBMS control signalling which is carried on an MCCH of an MBMS control channel is called as an MCCH message) of a Broadcast Control Channel (BCCH) and a Multicast Control Channel (MCCH) to acquire resource configuration information of the MBMS in the target cell. If the target cell and the source cell belong to the same MBMS over a Single Frequency Network (MBSFN) area, that is, the target cell and the source cell both belong to this MBSFN area (the MBSFN area of the disclosure is also abbreviated as MBSFN), then after entering the target cell, the UE can directly use the MBMS resource configuration information of the source cell (current cell) to receive the MBMS in the target cell without reading the resource configuration information of the MBMS in the target cell, and the contents of the MBMS are carried on the Multicast Traffic Channel (MTCH) of the MBMS to realize the continuity of the MBMS. Each MBMS is carried on one MTCH channel, and each MTCH channel only carries the content of one MBMS, wherein reading an MTCH in the disclosure refers to reading the content of the MBMS carried on the MTCH channel. If the target cell and the source cell belong to different MBSFN areas, then after entering the target cell, UE needs to read resource configuration information of the MBMS. If the MBMS which needs to be received by UE is not sent in the target cell, then after entering the target cell, the UE cannot read the resource configuration information of the MBMS and is also unable to receive the MBMS.

The receiving state of UE having the MBMS capacity includes being receiving an MBMS and being interested in receiving an MBMS. Being interested in receiving an MBMS refers to that UE has not received the MBMS and is prepared to receive the MBMS, under such case, the UE can monitor an MBMS notification message so as to further read the MCCH message and MBMS data according to the MBMS notification message.

Before an MBMS session starts, a Broadcast-Multicast Service Centre (BM-SC) performs service announcement at first, and the purpose of the announcement is to send to the UE a brief introduction of the MBMS, such as an Electric Service Guide (ESG). The announcement can be sent by the following manners: MBMS carrying, or interactive modes, such as Hypertext Transfer Protocol (HTTP), or Picture Transfer Protocol (PTP) push mode, such as SMS, MMS, HTTP push. The announcement may last even after the MBMS session ends. The content of the ESG is carried on a User Service Description (USD), a user can know in advance the MBMS service area (MBMS SA), which is represented by {TMGI, MBMS SAI list} on the USD, of each MBMS service (the MBMS service in the disclosure also may be called a service, or is called MBMS for short) before the service starts by reading the content of the USD carried on the ESG, wherein a Temporary Mobile Group Identity (TMGI) corresponds to a certain MBMS, and the MBMS SAI list corresponds to a Service Area Identity (SAI) list of the service.

In the related art, the process for a user to be interested in a certain MBMS and begin to read the service is described as follows.

The UE knows in advance the TMGI identities corresponding to multiple MBMS including the MBMS of interest, the TMGI identity of which is assumed to be as TMGI1. UE resides in a certain cell, if the user is interested in a certain MBMS (assuming that the TMGI identity of the MBMS of interest is TMGI1), then the UE needs to find and initialize (begin) to read the TMGI1 through the following steps.

Firstly, the UE reads a System Information Block (SIB) of the cell carried on the BCCH. If the UE is interested in a certain MBMS, then the UE needs to read SIB13 (an SIB numbered as 13), configuration information of one or more MCCHs is carried on the SIB13, and each MCCH corresponds to one MBSFN area. By reading SIB13, the UE can read: 1) the MBSFN area ID (MBSFN area identity) corresponding to each MCCH, and 2) configuration parameters of each MCCH (that is, which radio resources on which an MCCH is configured, so as to facilitate the UE to further read an MCCH message correctly on the radio resources).

Then, the UE reads each of the above-mentioned MCCH messages so as to know whether the MBMS of interest is carried in a certain MBSFN area. Each MCCH message carries MBSFN resources configured for the one MBSFN area corresponding to the MCCH message and scheduling information of all MBMSs of the MBSFN area (UE can know which MBSFN resources each MBMS is particularly scheduled on). Each MBMS uniquely corresponds to one MTCH, that is, the content of each MBMS is uniquely carried on one MTCH. Specifically, by reading the MCCH message, the UE can read: 1) which radio resources all the MTCHs of the MBSFN area corresponding to the MCCH message are respectively configured on, and 2) which MTCH that the MBMS of interest of the UE is further scheduled on. For example, the MBMS TMGI1 of interest of the UE is configured on a certain MTCH of a certain MBSFN area.

Finally, the UE reads the content on the MTCH (such as MTCH1) corresponding to the service of interest, and meanwhile, the UE needs to continue reading the MCCH message corresponding to the service of interest. Once the resource configuration regarding the MTCH1 on the MCCH message is changed, the UE can continue reading the MTCH1 on the specified radio resources.

In conclusion, in order to find and initialize (begin) to read the TMGI 1, UE needs to read SIB 13 (to acquire the configuration parameters of the MCCH, read MCCH (to find which MTCH the service of interest is carried on) and read the MTCH carrying the service of interest.

In the process of moving, as for UE in the idle state, a cell selection or reselection flow is usually used to enter a target cell; and as for UE in the connected state, a cell switch flow is usually used to enter the target cell. The cell selection or reselection belongs to the mobility of UE under the idle state. The purpose of the cell selection or reselection is to ensure that the UE in the idle state resides in an optimal cell. In a wireless network, the cell selection or reselection is a necessary process mainly due to the reason that the mobility of the UE and the volatility of the wireless environment may cause the fluctuation of the signal strength and the interference level.

One UE resides in a source cell (original cell) and is in the state of being receiving a certain MBMS of interest in this cell. When this UE moves to a target cell from the source cell and resides in the target cell through cell selection/reselection (or cell handover process), according to the fact whether the source cell and the new cell belong to the same MBSFN area, the mobility of the UE can be further classified into the UE moving in the same MBSFN area (also called: Intra-MBSFN area mobility), or the UE moving in different MBSFN areas (also called: Inter-MBSFN area mobility).

After the UE resides in a certain cell of a certain MBSFN area (set as MBSFN1) and can read an MBMS of interest in the cell, the UE moves to a new cell (set as cell2) from the current cell (set as cell1), under such case, the UE will read SIB13 of the new cell so as to know whether the MBSFN area or MBSFN areas is/are changed by comparing the MBSFN area or MBSFN areas of the new cell with that of the source cell, that is, whether cell2 belongs to the original MBSFN1, and whether the UE can continue receiving TMGI1.

On another hand, a certain cell may be in the coverage area of multiple different MBSFN areas, that is, this cell is within the coverage area of overlapped MBSFN areas. For example, cell 1 is in the overlapped coverage area of {MBSFN1, MBSFN2}, cell 2 is in the overlapped coverage area of {MBSFN1, MBSFN3}, as shown in FIG. 1 which is a schematic diagram of the state that UE moves among multiple MBSFN areas according to the related technologies.

In this case, when the UE moves from cell 1 to cell 2, regarding MBSFN1, the UE is moving in the same MBSFN; however, regarding other MBSFN areas, the UE is moving in different MBSFNs. If the MBMS of interest which is being received is carried in the MBSFN1 area, then the UE can receive the service both in cell1 and cell2, but if the MBMS of interest which is being received is carried in MBSFN2, then when moving from cell1 to cell2, the UE may not be able to continue receiving the service in cell2.

In the prior art of 3GPP, it is generally supposed that the MBMSs configured on two adjacent MBSFN areas are different, that is to say, the prior art mainly describes the service continuity (the continuity in the disclosure refers to that whether the UE can receive the same MBMS when the UE moves between two cells) when the UE moves in the same MBSFN area. However, how to ensure the service continuity of UE to receive the same service when the UE moves in different cells among different MBSFNs, especially the solution of how to keep the continuity of the service under the condition that the MBSFN of the target cell cannot carry the MBMS, is not researched and provided. When the UE moves to a cell the corresponding MBSFN of which can not carry the MBMS, the network side is not aware of this situation, therefore, the network side can not guarantee the continuity of the MBMS which results in the interruption of the service and the dissatisfaction of the user.

SUMMARY

The disclosure provides a method, device and user equipment for sending indication information, and a method and device for receiving a multimedia broadcast multicast service.

According to an aspect of the disclosure, a method for sending indication information is provided, including: user equipment (UE) determining that the UE has left one or more multimedia broadcast multicast service over a single frequency network (MBSFN) areas which can carry a predetermined multimedia broadcast multicast service (MBMS), wherein the predetermined MBMS is an MBMS which the UE was receiving or was prepared to receive before the UE left the one or more MBSFN areas; the UE sending indication information to a network side.

Preferably, the UE determining that the UE has left the one or more MBSFN areas which can carry the predetermined MBMS includes: after the UE leaves a source cell and resides in a target cell, under the condition that the UE is unable to obtain resource configuration information corresponding to the predetermined MBMS from a system broadcast message of the target cell, the UE determining that the UE has left the one or more MBSFN areas which can carry the predetermined MBMS; under the condition that the UE monitors that a signal quality of the predetermined MBMS being received is lower than a signal quality threshold, the UE determining that the UE has left the one or more MBSFN areas which can carry the predetermined MBMS; under the condition that the UE monitors that a bit error rate of decoding the predetermined MBMS being received is higher than a bit error rate threshold, the UE determining that the UE has left the one or more MBSFN areas which can carry the predetermined MBMS.

Preferably, the UE being unable to obtain the resource configuration information corresponding to the predetermined MBMS from the system broadcast message of the target cell includes: the UE being unable to obtain configuration information of any multicast control channel (MCCH) from the system broadcast message of the target cell; or the UE obtaining configuration information of one or more MCCHs from the system broadcast message of the target cell, but none of one or more MBSFN areas corresponding to the one or more MCCHs included in the system broadcast message being capable of carrying the predetermined MBMS.

Preferably, the method further includes: when the UE is unable to obtain the resource configuration information corresponding to the predetermined MBMS from the system broadcast message of the target cell, according to resource configuration information corresponding to the predetermined MBMS obtained from a system broadcast message in the source cell before leaving the source cell, the UE continuing receiving or starting to receive the predetermined MBMS in the target cell.

Preferably, under the condition that the UE can read MCCH and MBMS channel (MTCH) corresponding to the resource configuration information according to the resource configuration information which corresponds to the predetermined MBMS and is obtained by the UE from the system broadcast message of the source cell before leaving the source cell, the UE sending the indication information to the network side.

Preferably, under the condition that the UE is in an idle mode, the UE sending the indication information to the network side includes: the UE initiating establishment of a radio resource control (RRC) connection and sending the indication information to the network side through a dedicated signalling after the RRC connection is established; under the condition that the UE is in a connected mode, the UE sending the indication information to the network side includes: the UE sending the indication information to the network side through a dedicated signalling.

Preferably, the network side is a base station, a core network element or an application server, under the condition that the network side is the base station, the UE sending the indication information to the network side includes: the UE sending, in the target cell, the indication information to the network side, and the base station transmitting the indication information to the core network element; and under the condition that the network side is the application server, the UE sending the indication information to the network side includes: the UE sending, in the target cell, the indication information to the network side, the base station transmitting the indication information to the core network element, and the core network element transmitting the indication information to the application server.

Preferably, after the UE sends the indication information to the network side, the method further includes: the network side establishing a bearer for transmitting the predetermined MBMS; the UE continuing receiving or starting to receive the predetermined MBMS via the established bearer.

Preferably, the network side establishing the bearer for delivering the predetermined MBMS includes: the network side receiving the indication information sent by the UE and returning to the UE a confirmation message carrying configuration information of the bearer; and the UE receiving the confirmation message returned by the network side and establishing the bearer according to the configuration information of the bearer carried in the confirmation message.

Preferably, if the UE does not receive the confirmation message returned by the network side within a predetermined time after the UE sends the indication information to the network side, and the number of times for the UE to send the indication information to the network side has not yet reached a predetermined number of attempt, then the UE sends again the indication information to the network side.

Preferably, the UE sends the indication information to the network side to trigger the network side to establish a bearer for the UE to transmit the predetermined MBMS.

Preferably, the indication information includes at least one of the following: a flag for indicating that the UE has left one or more MBSFN areas which can carry the predetermined MBMS; one or more identifiers of the one or more MBSFN areas which can carry the predetermined MBMS; a server identifier of the predetermined MBMS; a request for establishing a bearer for transmitting the predetermined MBMS.

According to another aspect of the disclosure, a device for sending indication information, which is located in user equipment (UE), is provided, wherein the device includes: a first determination module, configured to determine that the UE has left one or more multimedia broadcast multicast service over a single frequency network (MBSFN) areas which can carry a predetermined multimedia broadcast multicast service (MBMS), wherein the predetermined MBMS is an MBMS which the UE was receiving or was prepared to receive before the UE left the one or more MBSFN areas; an indication module, configured to send indication information to a network side when the first determination module determines that the UE has left the one or more MBSFN areas which can carry the predetermined MBMS.

Preferably, the first determination module is configured to: after the UE leaves a source cell and resides in a target cell, under the condition that the UE is unable to obtain resource configuration information corresponding to the predetermined MBMS from a system broadcast message of the target cell, determine that the UE has left the one or more MBSFN areas which can carry the predetermined MBMS; under the condition that the UE monitors that a signal quality of the predetermined MBMS being received is lower than a signal quality threshold, determine that the UE has left the one or more MBSFN areas which can carry the predetermined MBMS; under the condition that the UE monitors that a bit error rate of decoding the predetermined MBMS being received is higher than a bit error rate threshold, determine that the UE has left the one or more MBSFN areas which can carry the predetermined MBMS.

Preferably, the first determination module is configured to determine that the UE is unable to obtain the resource configuration information corresponding to the predetermined MBMS from the system broadcast message of the target cell under the following condition: the UE being unable to obtain configuration information of any multicast control channel (MCCH) from the system broadcast message of the target cell; or the UE obtaining configuration information of one or more MCCHs from the system broadcast message of the target cell, but none of one or more MBSFN areas corresponding to the one or more MCCHs included in the system broadcast message being capable of carrying the predetermined MBMS.

Preferably, the device further includes: a first receiving module, configured to, when the UE is unable to obtain the resource configuration information corresponding to the predetermined MBMS from the system broadcast message of the target cell, according to resource configuration information corresponding to the predetermined MBMS obtained from a system broadcast message in the source cell before leaving the source cell, continue receiving or start to receive the predetermined MBMS in the target cell.

Preferably, the indication module is configured to send the indication information to the network side under the condition that the UE can read MCCH and MBMS channel (MTCH) corresponding to the resource configuration information according to the resource configuration information which corresponds to the predetermined MBMS and is obtained by the UE from the system broadcast message of the source cell before leaving the source cell.

Preferably, the first receiving module is further configured to, after the network side establishes a bearer for transmitting the predetermined MBMS, continue receiving or start to receive the predetermined MBMS via the established bearer.

Preferably, the indication module is configured to send the indication information to the network side to trigger the network side to establish a bearer for the UE to transmit the predetermined MBMS.

Preferably, the indication information includes at least one of the following: a flag for indicating that the UE has left one or more MBSFN areas which can carry the predetermined MBMS; one or more identifiers of the one or more MBSFN areas which can carry the predetermined MBMS; a server identifier of the predetermined MBMS; a request for establishing a bearer for transmitting the predetermined MBMS.

According to still another aspect of the disclosure, user equipment is provided, wherein the user equipment includes the device for sending the indication information as mentioned above.

According to still another aspect of the disclosure, a method for receiving a multimedia broadcast multicast service is provided, including: user equipment (UE) receiving a specified MBMS which is carried in one or more MBMS over a single frequency network (MBSFN) area to which a source cell where the UE is currently located belongs; after the UE performs cell reselection and resides in a target cell, in the case that the UE determines that one or more MBSFN areas to which the target cell belongs are different from one or more MBSFN areas to which the source cell belongs, the UE acquiring a condition of one or more MBMSs which are carried in the one or more MBSFN areas to which the target cell belongs; and the UE continuing receiving the specified MBMS in the target cell according to the acquired MBMS condition.

The UE continuing receiving the specified MBMS according to the acquired MBMS condition includes: when the MBMS condition is that the specified MBMS is not carried in any of the one or more MBSFN areas to which the target cell belongs, the UE continuing receiving the specified MBMS according to configuration parameters provided by the source cell.

The UE continuing receiving the specified MBMS according to the acquired MBMS condition includes: when the MBMS condition is that the specified MBMS is carried in part of the MBSFN areas to which the target cell belongs, the UE selecting one or more MBSFN areas from the part of the MBSFN areas according to a predetermined strategy to continue receiving the specified MBMS.

The part of the MBSFN areas includes one or more MBSFN areas to which the source cell belongs.

The UE selecting one or more MBSFN areas from the part of the MBSFN areas according to the predetermined strategy to continue receiving the specified MBMS includes: the UE preferentially selecting one or more MBSFN areas to which the source cell belongs from the part of the MBSFN areas to continue receiving the specified MBMS.

After the UE selects multiple MBSFN areas from the part of the MBSFN areas to continue receiving the specified MBMS, the UE combines the specified MBMS received from the multiple selected MBSFN areas.

The predetermined strategy includes one of the following: selecting one or more MBSFN areas at random from the part of the MBSFN areas; and selecting one or more MBSFN areas according to signal quality of one or more MBMSs carried in each MBSFN area in the part of the MBSFN areas.

There are multiple MBSFN areas to which the source cell belongs, and the UE receiving the specified MBMS which is carried in the one or more MBSFN areas to which the source cell where the UE is currently located belongs includes: the UE selecting one or more MBSFN areas from the multiple MBSFN areas to which the source cell belongs to receive the specified MBMS.

According to still another aspect of the disclosure, a device for receiving a multimedia broadcast multicast service (MBMS), which is located in user equipment (UE), is provided, and the device includes: a receiving module configured to receive a specified MBMS which is carried in one or more MBMS over a single frequency network (MBSFN) area to which a source cell where the UE is currently located belongs, and continue receiving the specified MBMS according to a condition of one or more MBMSs which are carried in one or more MBSFN areas to which the target cell belongs, which is acquired by an acquisition module, wherein the target cell is a cell where the UE resides after performing cell reselection; a determination module configured to, after the UE performs cell reselection and resides in the target cell, determine that the one or more MBSFN areas to which the target cell belongs are different from one or more MBSFN areas to which the source cell belongs; and an acquisition module configured to, in the case that the determination module determines that the one or more MBSFN areas to which the target cell belongs are different from the one or more MBSFN areas to which the source cell belongs, acquire the condition of one or more MBMSs which are carried in the one or more MBSFN areas to which the target cell belongs.

The receiving module is further configured to, when the MBMS condition is that the specified MBMS is not carried in any of the one or more MBSFN areas to which the target cell belongs, continue receiving the specified MBMS according to configuration parameters provided by the source cell.

The receiving module is further configured to, when the MBMS condition is that the specified MBMS is carried in part of the MBSFN areas to which the target cell belongs, select one or more MBSFN areas from the part of the MBSFN areas according to a predetermined strategy to continue receiving the specified MBMS.

The receiving module is further configured to, in the case that there are multiple MBSFN areas to which the source cell belongs, select one or more MBSFN areas from the multiple MBSFN areas to which the source cell belongs to receive the specified MBMS.

Through the disclosure, after the UE performs cell reselection and resides in a target cell, in the case that the UE determines that one or more MBSFN areas to which the target cell belongs are different from one or more MBSFN areas to which the source cell belongs, the UE continues receiving a specified MBMS in the target cell according to a required MBMS condition. In another solution provided by the disclosure, the UE sends indication information to the network side when determining that the UE has left one or more MBSFN areas which can carry the predetermined MBMS.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
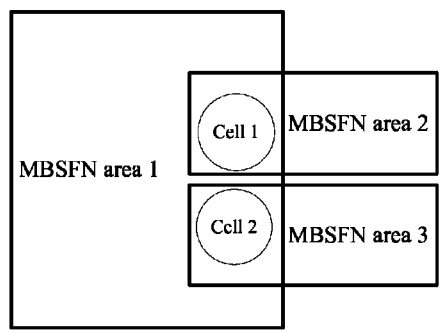
FIG. 1 is a schematic diagram of the state that UE moves among multiple MBSFN areas according to the related technologies.
Figure 2:
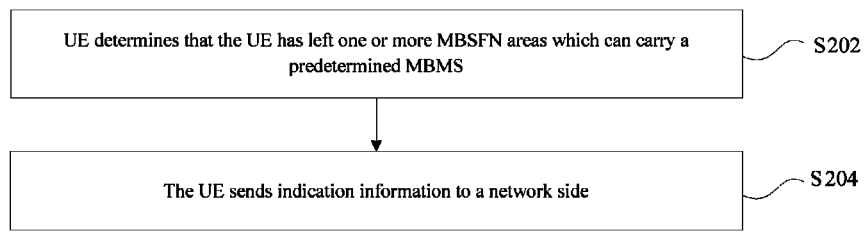
FIG. 2 is a flowchart of a method for sending indication information according to an embodiment of the disclosure.

An embodiment of the disclosure provides a method for sending indication information. FIG. 2 is a flowchart of a method for sending indication information according to an embodiment of the disclosure, as shown in FIG. 2, the method includes:

Step S202, UE determines that the UE has left one or more MBSFN areas which can carry a predetermined MBMS, wherein the predetermined MBMS is an MBMS which the UE was receiving or was prepared to receive before the UE left the one or more MBSFN areas;

Step S204, the UE sends indication information to a network side.

By virtue of the above technical solution in the embodiment, the network side can be aware of the situation that the UE has left the one or more MBSFN areas which can carry the MBMS which is being received or the UE is prepared to receive in time, and this can facilitate that the network side takes measures to ensure the continuity of the MBMS service.

During specific implementation, the UE may determine that the UE has left one or more MBSFN areas which can carry a predetermined MBMS by any one of the following manners (1) to (3).

(1) After the UE leaves a source cell and resides in a target cell, under the condition that the UE is unable to obtain resource configuration information corresponding to the predetermined MBMS from a system broadcast message of the target cell, the UE determines that the UE has left the one or more MBSFN areas which can carry the predetermined MBMS.

(2) Under the condition that the UE monitors that a signal quality of the predetermined MBMS being received is lower than a signal quality threshold, the UE determines that the UE has left the one or more MBSFN areas which can carry the predetermined MBMS. In the embodiment, if the UE considers that the signal quality of the MBMS being received currently is very poor, for example, the signal quality is lower than a pre-configured signal quality threshold, then the UE determines that the UE has left the MBSFN area corresponding to the MBMS, and sends the indication information.

(3) Under the condition that the UE monitors that a bit error rate of decoding the predetermined MBMS being received is higher than a bit error rate threshold, the UE determines that the UE has left the one or more MBSFN areas which can carry the predetermined MBMS. In the embodiment, if the UE can not receive the MBMS properly, for example, the UE can not decode the content of the MBMS, i.e., the bit error rate is very high, then the UE determines that the UE has left the MBSFN area corresponding to the MBMS, and sends the indication information.

Figure 3:
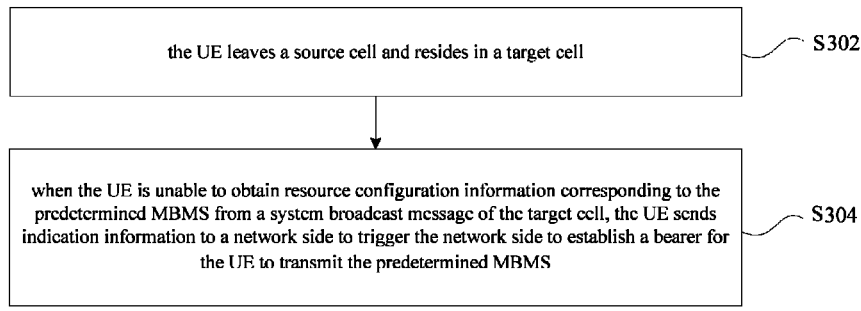
FIG. 3 is a flowchart of a method for sending indication information in the case that the UE leaves the one or more MBSFN areas which can carry the predetermined MBMS due to that the UE leaves the source cell and resides in the target cell according to an embodiment of the disclosure.

For the situation that the UE leaves a source cell and resides in a target cell, and the UE is unable to obtain resource configuration information corresponding to the predetermined MBMS from a system broadcast message of the target cell, i.e., the UE leaves the one or more MBSFN areas which can carry the predetermined MBMS due to that the UE leaves the source cell and resides in the target cell, a preferable embodiment of the disclosure provides a preferable method for sending indication information. FIG. 3 is a flowchart of a method for sending indication information in the case that the UE leaves the one or more MBSFN areas which can carry the predetermined MBMS due to that the UE leaves the source cell and resides in the target cell according to an embodiment of the disclosure, as shown in FIG. 3, the method includes:

Step S302, the UE leaves a source cell and resides in a target cell;

Step S304, when the UE is unable to obtain resource configuration information corresponding to the predetermined MBMS from a system broadcast message of the target cell, according to the resource configuration information corresponding to the predetermined MBMS obtained from a system broadcast message in the source cell before leaving the source cell, the UE continues receiving or starts to receive the predetermined MBMS in the target cell, and sends indication information to a network side, wherein the predetermined MBMS is an MBMS that the UE was receiving or was prepared to receive in the source cell before leaving the source cell.

It should be noted that the UE, in the source cell, may be in the state of being receiving the predetermined MBMS (that is, the "being receiving MBMS" in the background section) or the state of being prepared to receiving the predetermined MBMS (that is, the "being interested in receiving MBMS" in the background section), then after residing in the target cell from the source cell, the UE can continue receiving the MBMS which "was being received" in the source cell, and starts to receive the MBMS which has not been received but "was interested in receiving" in the source cell. That is to say, the predetermined MBMS can be an MBMS which was being received or being interested in.

In the source cell, the UE can read the system broadcast message of the cell and can learn that the cell belongs to one or more MBSFN areas corresponding to the above-mentioned MBMS service, that is, the UE is in one or more MBSFN areas where the above-mentioned MBMS service is located. In such a case, the UE can receive the predetermined MBMS in the source cell. After residing in the target cell, the UE cannot obtain a message related to one or more MBSFN areas corresponding to the above-mentioned MBMS service and thus can know that the cell does not belong to any MBSFN area corresponding to the above-mentioned MBMS service, that is, the UE is outside the MBSFN area where the above-mentioned MBMS service is located, that is to say, the UE moves out of the MBSFN area from inside the MBSFN area corresponding to the above-mentioned MBMS service.

In the above-mentioned method, if the UE is unable to obtain resource configuration information corresponding to the predetermined MBMS from a system broadcast message in the target cell, for example, the MCCH configuration information corresponding to the MBSFN to which the predetermined MBMS which the UE is interested in or is being received belongs is not included in the system broadcast message of the target cell, then the UE continues receiving or starts to receive the predetermined MBMS in the target cell according to the resource configuration information corresponding to the predetermined MBMS obtained from a system broadcast message in the source cell before leaving the source cell and sends indication information to a network side so as to trigger the network side to establish a bearer for the UE to transmit the predetermined MBMS. Considering that in the MBSFN area, a plurality of base stations working in the same frequency point can send MBMS services with the same content at the same time so as to generate a macro diversity gain under the duplicate effect, although the target cell does not belong to the coverage area of any MBSFN carrying the predetermined MBMS in the source cell, that is, the source cell is inside the MBSFN area, and the target cell is outside the MBSFN area, the signals of MCCH and MTCH may be still very strong, go beyond the area of the source cell and extend to the area of the target cell due to the macro diversity gain of the MBSFN, that is to say, the signals of MCCH and MTCH may exceed to the outside of the MBSFN area, at this moment, under the function of the macro diversity gain, the predetermined MBMS the UE receives or starts to receive in the target cell may be derived from the duplicate effect of the service signals of a plurality of cells in the MBSFN area. By means of this characteristic, under the condition that there is no MBSFN for carrying the predetermined MBMS in the target cell, the resource configuration of the source cell is still adopted to continue receiving the MBMS or start to receive the MBMS of interest as far as possible (corresponding to the UE receiving the predetermined MBMS in the target cell in the above-mentioned step S304) and send indication information to trigger the network side to establish a new bearer, thus keeping the continuity of the MBMS after the UE resides in the target cell through the cell selection/cell reselection process or through the handoff process and before a new bearer is established. The method in the embodiment can keep the continuity of the service under the condition that the MBSFN in the target cell cannot carry the MBMS which the UE is interested in or being received.

The network side of the embodiment of the disclosure can be a base station (such as an evolution base station eNB), also may be a core network element, and also can be an application server. When the network side refers to the core network element, UE sends indication information to eNB in the target cell and the eNB forwards same to the core network element; and when the network side refers to the application server, UE sends indication information to eNB in the target cell, the eNB forward same to the core network element and the core network element further forwards same to the application server. In the disclosure, UE sends indication information to the network side, after receiving the indication information, the network element of the network side triggers to establish a new bearer for the UE so as to allow the predetermined MBMS service the UE was receiving originally (or was prepared to receive) to be sent to the UE through the new bearer, in this way, the UE can continue receiving the predetermined MBMS service on the new bearer established by the network side for the UE.

Figure 4:
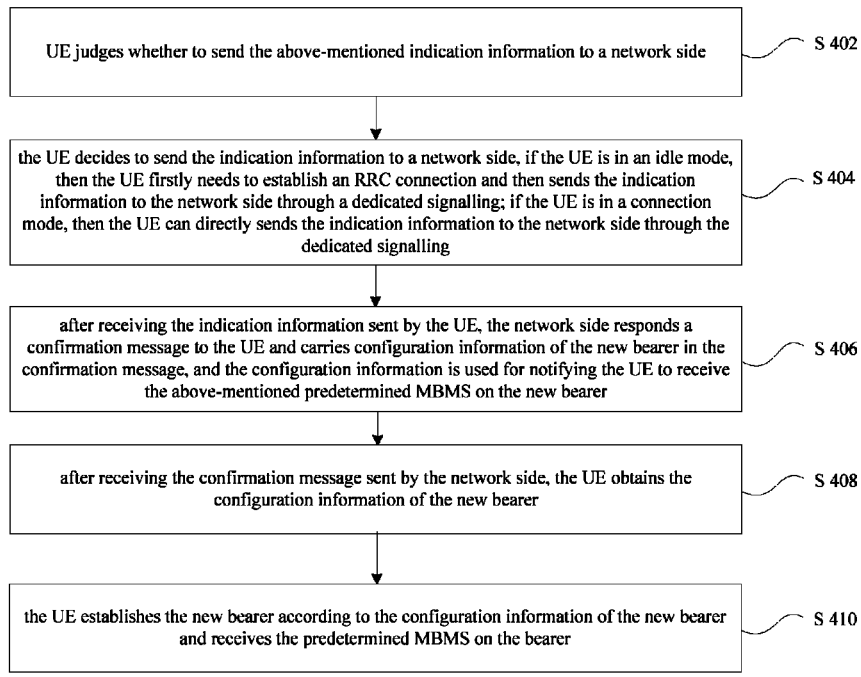
FIG. 4 is a detailed flowchart of the process of UE sending indication information to a network side so as to trigger the network side to establish a bearer for the UE to transmit the predetermined MBMS according to an embodiment of the disclosure.

FIG. 4 is a detailed flowchart of the process of UE sending indication information to a network side so as to trigger the network side to establish a bearer for the UE to transmit the predetermined MBMS according to an embodiment of the disclosure. As shown in FIG. 3, in a preferred implementation, in the above-mentioned step S304, the process of UE sending indication information to a network side so as to trigger the network side to establish a bearer for the UE to transmit the predetermined MBMS can further includes the following steps:

Step S402, UE judges whether to send the above-mentioned indication information to a network side;

Step S404, the UE decides to send the indication information to a network side, if the UE is in an idle mode, then the UE firstly needs to establish an RRC connection and then sends the indication information to the network side through a dedicated signalling; if the UE is in a connection mode, then the UE can directly sends the indication information to the network side through the dedicated signalling;

Step S406, after receiving the indication information sent by the UE, the network side responds a confirmation message to the UE and carries configuration information of the new bearer in the confirmation message, and the configuration information is used for notifying the UE to receive the above-mentioned predetermined MBMS on the new bearer.

Step S408, after receiving the confirmation message sent by the network side, the UE obtains the configuration information of the new bearer;

Step S410, the UE establishes the new bearer according to the configuration information of the new bearer and receives the predetermined MBMS on the bearer;

Preferably, if the UE sends the above-mentioned indication information but does not obtain the confirmation message of the network side, then the UE again sends the indication information to the network side. In addition, a pre-configured number of times for attempting can be set in the UE, if the number of the times for the UE to send the indication information reaches the pre-configured number of times for attempting, then the processing is ended.

In practical application, the UE being unable to obtain resource configuration information corresponding to a predetermined MBMS from a system broadcast message of the target cell in step S304 may include:

the UE is unable to obtain configuration information of any multicast control channel (MCCH) from a system broadcast message of the target cell, for example, under the existing standard, UE is unable to obtain SIB 13 from the system broadcast message of the target cell, that is, no MBSFN area is configured on the target cell; or the UE obtains configuration information of one or more MCCH from a system broadcast message of the target cell, but one or more MBSFN areas corresponding to the one or more MCCHs included in the system broadcast message is incapable of carrying the predetermined MBMS, for example, under the existing standards, the UE obtains SIB 13 from the system broadcast message of the target cell, but the one or more MBSFN areas corresponding to the one or more MCCH included in the SIB 13 cannot carry the predetermined MBMS, particularly, the MBSFN area corresponding to the predetermined MBMS in the source cell is not included in the SIB 13 (that is, the UE has left the MBSFN area), and also there is no MBSFN area which can carry the predetermined MBMS in the MBSFN areas corresponding to MCCHs included in the SIB 13.

As an implementation, under the condition that the UE can read MCCH and MTCH corresponding to the resource configuration information according to the resource configuration information which corresponds to the predetermined MBMS and is obtained from a system broadcast message in the source cell before leaving the source cell, the UE sends indication information to a network side so as to trigger the network side to establish a bearer for the UE to transmit the predetermined MBMS. This method in the embodiment can guarantee the mobility of the predetermined MBMS to the largest extent. Of course, the UE can send indication information to the network side so as to trigger the network side to establish a bearer for the UE to transmit the predetermined MBMS under the condition that the UE is unable to obtain MCCH and MTCH corresponding to the resource configuration information according to the resource configuration information which corresponds to the MBMS and is provided by the source cell (it may be because that the resource configuration information of the source cell has been changed, or the UE is far from the original MBSFN area), and this solution in the embodiment can enable the UE to recover the receiving of the predetermined MBMS as soon as possible.

As a preferred implementation, after the network side establishes a bearer for the UE to transmit the predetermined MBMS, the UE continues receiving or starts to receive the predetermined MBMS through the established bearer.

In the above embodiments, the indication information is sent from the UE to the network side to trigger the network side to establish a bearer for transmitting the predetermined MBMS for the UE. With regard to the content of the indication information, the indication information can notify the network side that the UE has left one or more MBSFN areas corresponding to the predetermined MBMS, so as to trigger the network side to establish the bearer for transmitting the predetermined MBMS for the UE. It should be noted that, although the UE has left the area corresponding to the predetermined MBMS from the aspect of system configuration, the UE can still receive the predetermined MBMS with good quality due to the effect of the macro diversity gain.

Based on the above reasons, the UE can not only send the indication information to trigger the network side to establish the bearer for transmitting the predetermined MBMS, at the same time, taking the benefit of the macro diversity gain, the UE can continue receiving or start to receive the predetermined MBMS in the target cell as far as possible according to the resource configuration information which corresponds to the predetermined MBMS and is obtained from the system broadcast message of the source cell before leaving the source cell.

Regarding the purpose or effect of the indication information, the indication information is sent to trigger the network side to establish the bearer for transmitting the predetermined MBMS for the UE. Regarding the content of the indication information, in practical application, the UE can send various kinds of indication information to the network side so as to facilitate that the network side establishes a new bearer to carry the predetermined MBMS, for example, the indication information sent by the UE can report to the network side at least one of the following contents (1) to (4).

(1) A flag for indicating that the UE has left one or more MBSFN areas which can carry the predetermined MBMS. In such case, after learning the information, the network side can know that the UE has left the MBSFN area(s) which can carry the predetermined MBMS and a new bearer needs to be established immediately for the UE so that the predetermined MBMS can be transmitted to the UE through the new bearer, thereby keeping the continuity of the service.

(2) One or more identifiers of the one or more MBSFN areas which can carry the predetermined MBMS. The indication information includes one or more identifiers of one or more MBSFN areas which can carry the predetermined MBMS, based on which the network side can know that the MBSFN area where the UE is currently located does not belong to the one or more MBSFN areas corresponding to the one or more identifiers, that is to say, the UE has left the one or more MBSFN areas which can carry the predetermined MBMS and a new bearer needs to be established for the UE immediately, so that the predetermined MBMS can be transmitted to the UE through the new bearer, thereby keeping the continuity of the service.

(3) Identification information of the predetermined MBMS, for example, the indication information includes the service identifier of the predetermined MBMS. In such case, the network side can learn that the predetermined MBMS the UE hopes to continue receiving or hopes to start to receive according to this identifier. Since the network side knows the configuration conditions of the MBSFN areas of all the cells and the MBSFN areas to which the MBMSs belong, the network side can know that the cell where the current UE is located cannot provide the predetermined MBMS for the UE, and thus, a new bearer needs to be established to transmit the predetermined MBMS to the UE through the new bearer, thereby keeping the continuity of the service.

(4) A request for establishing a bearer for transmitting the predetermined MBMS, for example, the indication information includes request information for requesting the network side to establish the bearer for the UE. In such case, the network side can respond to the request to establish a new bearer for the UE so as to transmit the predetermined MBMS to the UE through the new bearer, thereby keeping the continuity of the service.

It should be noted that the UE can trigger the network side to establish a new bearer for the UE through various kinds of indication information, the content of the indication information is not defined to the above-enumerated contents, only if the UE and the network side have agreements on the indication information in advance, the UE can successfully trigger the network side to establish a new bearer for the UE under the circumstance of meeting the indication condition (for example, the UE is unable to obtain resource configuration information corresponding to a predetermined MBMS from the system broadcast message of the target cell), for example, the easiest way is that the UE and the network side agree on a field and agree about the meaning of the value of the filed (for example, 1 represents that a new bearer needs to be established).

Figure 5:
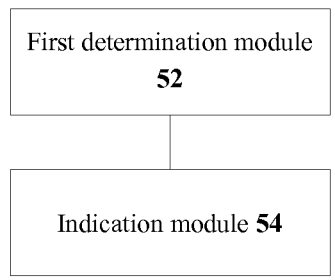
FIG. 5 is a structural block diagram of a device for sending indication information according to an embodiment of the disclosure.

An embodiment of the disclosure also provides a device for sending indication information, which device is located in UE. FIG. 5 is a structural block diagram of the device for sending the indication information according to an embodiment of the disclosure, as shown in FIG. 5, the device includes:

a first determination module 52, configured to determine that the UE has left one or more MBSFN areas which can carry a predetermined MBMS, wherein the predetermined MBMS is an MBMS which the UE was receiving or was prepared to receive before the UE left the one or more MBSFN areas;

an indication module 54, coupled with the first determination module 52 and configured to send indication information to a network side when the first determination module determines that the UE has left the one or more MBSFN areas which can carry the predetermined MBMS.

Preferably, the first determination module 52 is configured to:

after the UE leaves a source cell and resides in a target cell, under the condition that the UE is unable to obtain resource configuration information corresponding to the predetermined MBMS from a system broadcast message of the target cell, determine that the UE has left the one or more MBSFN areas which can carry the predetermined MBMS;

under the condition that the UE monitors that a signal quality of the predetermined MBMS being received is lower than a signal quality threshold, determine that the UE has left the one or more MBSFN areas which can carry the predetermined MBMS;

under the condition that the UE monitors that a bit error rate of decoding the predetermined MBMS being received is higher than a bit error rate threshold, determine that the UE has left the one or more MBSFN areas which can carry the predetermined MBMS.

In practical application, the first determination module 52 is configured to determine that the UE is unable to obtain resource configuration information corresponding to the predetermined MBMS in the target cell when the following conditions appear:

it is unable to obtain configuration information of MCCH from a system broadcast message of the target cell; for example, under the existing standards, it is unable to obtain SIB 13 from the system broadcast message of the target cell, that is, no MBSFN area is configured on the target cell; or the UE obtains configuration information of the MCCH from a system broadcast message of the target cell, but the MBSFN area corresponding to the MCCH included in the system broadcast message is incapable of carrying the predetermined MBMS, for example, under the existing standards, the UE obtains SIB 13 from the system broadcast message of the target cell, but the MBSFN area corresponding to the MCCH included in the SIB 13 cannot carry the predetermined MBMS, particularly, the MBSFN area corresponding to the predetermined MBMS in the source cell is not included in the SIB 13 (that is, the UE has left the MBSFN area), and also there is no MBSFN area which can carry the predetermined MBMS in the MBSFN areas corresponding to MCCHs included in the SIB 13.

Figure 6:
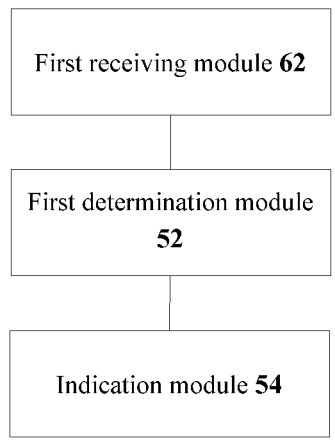
FIG. 6 is a first preferable structural block diagram of a device for sending indication information according to an embodiment of the disclosure.

FIG. 6 is a first preferable structural block diagram of the device for sending the indication information according to an embodiment of the disclosure, as shown in FIG. 6, the device may further include: a first receiving module 62, configured to, when the first determination module 52 determines that the UE is unable to obtain the resource configuration information corresponding to the predetermined MBMS from the system broadcast message of the target cell, according to resource configuration information corresponding to the predetermined MBMS obtained from a system broadcast message in the source cell before leaving the source cell, continue receiving or start to receive the predetermined MBMS in the target cell.

As an preferable embodiment, the indication module 54 is configured to send the indication information to a network side under the condition that the first determination module 52 determines that the UE is unable to obtain resource configuration information corresponding to the predetermined MBMS in the target cell, and the first receiving module 62 can read corresponding MCCH and MTCH according to the resource configuration information which corresponds to the predetermined MBMS and is obtained from a system broadcast message in the source cell before leaving the source cell, thereby guaranteeing the mobility of the predetermined MBMS to the largest extent. Of course, the indication module 54 is also configured to send the indication information to the network side so as to trigger the network side to establish a bearer for the UE to transmit the predetermined MBMS under the condition that the UE is unable to read corresponding MCCH and MTCH according to the resource configuration information which corresponds to the predetermined MBMS and is obtained from the source cell before leaving the source cell (it may be because that the resource configuration information of the source cell has been changed, or the UE is far from the original MBSFN area), and this solution in the embodiment can enable the UE to recover to receive the predetermined MBMS as soon as possible.

In a preferable embodiment, the first receiving module 62 is further configured to continue receiving or start to receive the predetermined MBMS via the established bearer after the network side establishes the bearer for the UE to transmit the predetermined MBMS. By virtue of the above manner, the UE can continue receiving the MBMS to ensure the continuity of the MBMS.

The indication module 54 is configured to send the indication information to the network side to trigger the network side to establish the bearer for the UE for transmitting the predetermined MBMS.

Regarding the purpose or effect of the indication information, the indication information is sent to trigger the network side to establish the bearer for transmitting the predetermined MBMS for the UE. Regarding the content of the indication information, in practical application, the UE can send various kinds of indication information to the network side so as to facilitate that the network side establishes a new bearer to carry the predetermined MBMS, for example, the indication information sent by the UE can report to the network side at least one of the following contents (1) to (4).

(1) A flag for indicating that the UE has left one or more MBSFN areas which can carry the predetermined MBMS. In such case, after learning the information, the network side can know that the UE has left the MBSFN area(s) which can carry the predetermined MBMS and a new bearer needs to be established immediately for the UE so that the predetermined MBMS can be transmitted to the UE through the new bearer, thereby keeping the continuity of the service.

(2) One or more identifiers of the one or more MBSFN areas which can carry the predetermined MBMS. The indication information includes one or more identifiers of one or more MBSFN areas which can carry the predetermined MBMS, based on which the network side can know that the MBSFN area where the UE is currently located does not belong to the one or more MBSFN areas corresponding to the one or more identifiers, that is to say, the UE has left the one or more MBSFN areas which can carry the predetermined MBMS and a new bearer needs to be established for the UE immediately, so that the predetermined MBMS can be transmitted to the UE through the new bearer, thereby keeping the continuity of the service.

(3) Identification information of the predetermined MBMS, for example, the indication information includes the service identifier of the predetermined MBMS. In such case, the network side can learn that the predetermined MBMS the UE hopes to continue receiving or hopes to start to receive according to this identifier. Since the network side knows the configuration conditions of the MBSFN areas of all the cells and the MBSFN areas to which the MBMSs belong, the network side can know that the cell where the current UE is located cannot provide the predetermined MBMS for the UE, and thus, a new bearer needs to be established to transmit the predetermined MBMS to the UE through the new bearer, thereby keeping the continuity of the service.

(4) A request for establishing a bearer for transmitting the predetermined MBMS, for example, the indication information includes request information for requesting the network side to establish the bearer for the UE. In such case, the network side can respond to the request to establish a new bearer for the UE so as to transmit the predetermined MBMS to the UE through the new bearer, thereby keeping the continuity of the service.

It should be noted that the indication module 54 can trigger the network side to establish a new bearer for the UE through various kinds of indication information, the content of the indication information is not defined to the above-enumerated contents, only if the indication module 54 and the network side have agreements on the indication information in advance, the indication module 54 can successfully trigger the network side to establish a new bearer for the UE under the circumstance of meeting the indication condition (for example, the UE is unable to obtain resource configuration information corresponding to a predetermined MBMS from the system broadcast message of the target cell), for example, the easiest way is that the indication module 54 and the network side agree on a field and agree about the meaning of the value of the filed (for example, 1 represents that a new bearer needs to be established).

Under the condition that the UE where the device is located is in an idle mode, the indication module 54 can initiate the establishment of a radio resource control (RRC) connection and send the indication information to the network side by a dedicated signalling after the RRC connection is established successfully; and under the condition that the UE where the device is located is in a connected mode, the indication module 54 can send the indication information to the network side by a dedicated signalling.

Preferably, the network side is a base station, a core network element or an application server, under the condition that the network side is a core network element, the indication module 54 is configured to send, in the target cell, the indication information to the base station to trigger the base station to transmit the indication information to the core network element; and under the condition that the network side is the application server, the indication module 54 is configured to send, in the target cell, the indication information to the base station to trigger the base station to transmit the indication information to the core network element, which then transmits the indication information to the application server.

Figure 7:
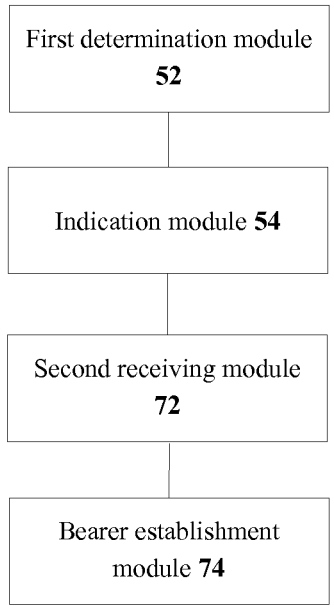
FIG. 7 is a second preferable structural block diagram of a device for sending indication information according to an embodiment of the disclosure.

FIG. 7 is a second preferable structural block diagram of a device for sending indication information according to an embodiment of the disclosure, as shown in FIG. 7, the device also includes a second receiving module 72 configured to receive a confirmation message which carries configuration information of the bearer and is returned by the network side for responding to the indication information; and a bearer establishment module 74, coupled with the second receiving module 72 and configured to establish the bearer according to the configuration information carried in the confirmation message.

Figure 8:
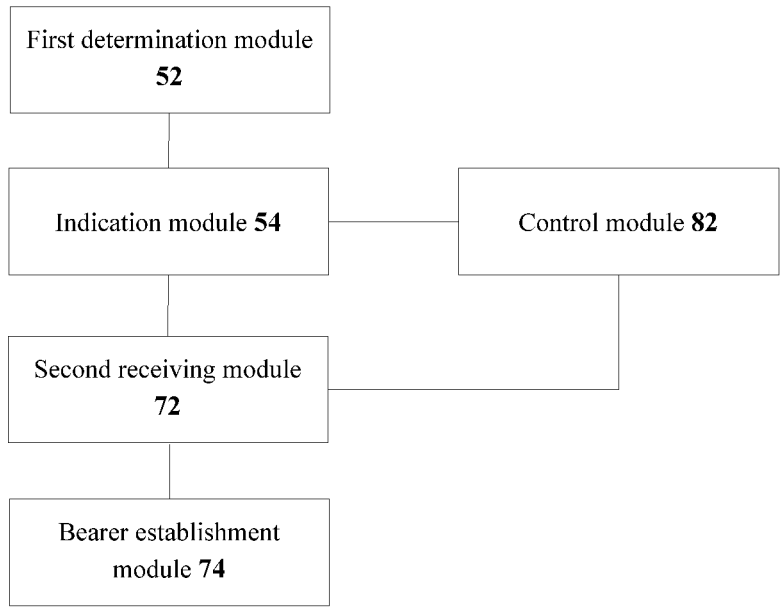
FIG. 8 is a third preferable structural block diagram of a device for sending indication information according to an embodiment of the disclosure.

FIG. 8 is a third preferable structural block diagram of a device for sending indication information according to an embodiment of the disclosure, as shown in FIG. 8, the device also includes a control module 82 coupled with the indication module 54 and the second receiving module 72, and configured to schedule the indication module 54 to send the indication information to the network side again under the condition that the second receiving module 72 does not receive the configuration information returned by the network side within a pre-configured time after the indication module 54 sends the indication information to the network side, and the number of times for the indication module 54 to send the indication information to the network side has not yet reached the pre-configured number of attempts.

The embodiment of the disclosure also provides a UE which includes the above-mentioned device for sending indication information, the internal structure thereof and the functions of the parts are described above, thereby needing no further description.

Figure 9:
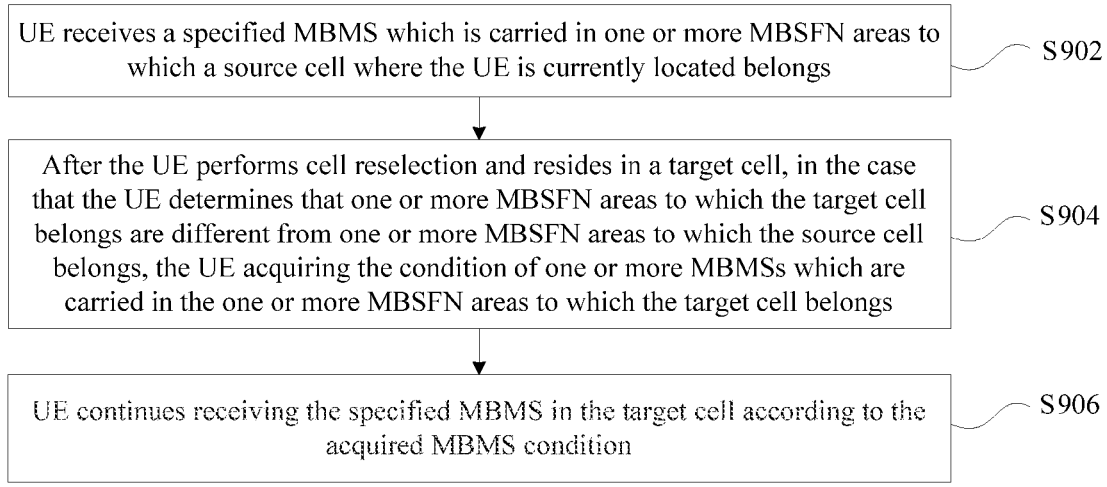
FIG. 9 is a flowchart of a method for receiving a multimedia broadcast multicast service according to an embodiment of the disclosure.

The embodiment of the disclosure also provides a solution of how to keep the continuity of the MBMS under various kinds of conditions after the UE reselects to the target cell from the source cell, FIG. 9 is the flowchart of a method for receiving a multimedia broadcast multicast service according to an embodiment of the disclosure. As shown in FIG. 9, the method includes:

Step S902, UE receives a specified MBMS which is carried in one or more MBSFN areas to which a source cell where the UE is currently located belongs;

Step S904, after the UE performs cell reselection and resides in a target cell, in the case that the UE determines that one or more MBSFN areas to which the target cell belongs are different from one or more MBSFN areas to which the source cell belongs, the UE acquires a condition (MBMS condition) of one or more MBMSs which are carried in the one or more MBSFN areas to which the target cell belongs; and Step S906, the UE continues receiving the specified MBMS in the target cell according to the acquired MBMS condition.

According to the above-mentioned processing steps in the embodiment, UE continues receiving the specified MBMS service according to the condition of one or more MBMSs which are carried in the one or more MBSFN areas to which the target cell belongs in the case that UE determines that the one or more MBSFN areas to which the target cell belongs are different from one or more MBSFN areas to which the source cell belongs. By virtue of the above technical solution in the embodiment, the UE can still keep the continuity of receiving the same service when the UE moves out of the current MBSFN area.

During specific implementation, the above-mentioned Step S902 can be implemented in following realization forms: when UE begins to receive an MBMS of interest (that is, the specified MBMS), the UE can know that the MBMS of interest is carried in one or more MBSFN areas on the current cell. The UE reads (that is, receives) the same MBMS of interest which is carried in one or more MBSFN areas therein.

Correspondingly, during specific implementation, the above-mentioned Steps S904 and S906 can be implemented in the following implementation processes: after UE moves to a new cell, if the new cell does not carry the MBMS of interest, then the UE adopts relevant configuration parameters provided by the source cell to receive the MBMS of interest which is received originally as far as possible so as to keep the service continuity of the service. After the UE moves to a new cell, if the new cell carries the MBMS of interest, then the UE can know that the MBMS of interest can be carried in one or more MBSFN areas on the current cell, and the UE reads (that is, receives) the same MBMS of interest which is carried in one or more MBSFN areas therein. When the UE can read the MBMS of interest from multiple MBSFN areas, the UE can select one of the MBSFN areas to read the MBMS of interest, the UE can also combine the contents of the MBMS obtained from the multiple different MBSFN areas so as to improve the receiving gain. The combining ways can be soft combining or selective combining, and also can be the combination of various combining methods.

The UE adopts different receiving methods to continue receiving the above-mentioned specified MBMS according to different MBMS conditions, which specifically may include, but are not limited to the following several conditions:

(1) When the above-mentioned MBMS condition is that the specified MBMS is not carried in any of the one or more MBSFN areas to which the target cell belongs, the UE continues receiving the specified MBMS according to configuration parameters provided by the source cell.

(2) When the MBMS condition is that the specified MBMS is carried in part of the MBSFN areas to which the target cell belongs, the UE selects one or more MBSFN areas from the part of the MBSFN areas according to a predetermined strategy to continue receiving the specified MBMS.

(3) The above-mentioned part of the MBSFN areas may include one or more MBSFN areas to which the source cell belongs, also may include one or more MBSFN areas which are different from the one or more MBSFN areas to which the source cell belongs. As for the former situation, the UE preferentially selects one or more MBSFN areas to which the source cell belongs from the part of MBSFN areas to continue receiving the specified MBMS, but is not limited to this, for example, also may select one or more MBSFN areas at random from the part of the MBSFN areas to continue receiving the specified MBMS.

After selecting multiple MBSFN areas from the above-mentioned part of the MBSFN areas to continue receiving the specified MBMS, the UE combines the specified MBMS received from the multiple selected MBSFN areas so as to improve the receiving gain of the specified service.

The above-mentioned predetermined strategy includes one of the following: selecting one or more MBSFN areas at random from the part of the MBSFN areas; and selecting one or more MBSFN areas according to the signal quality of one or more MBMSs which are carried in each MBSFN area in the part of the MBSFN areas.

There may be multiple MBSFN areas to which the above-mentioned source cell belongs in practical application, under this situation, UE may select one or more MBSFN areas from the multiple MBSFN areas to which the source cell belongs to receive the specified MBMS.

Figure 10:
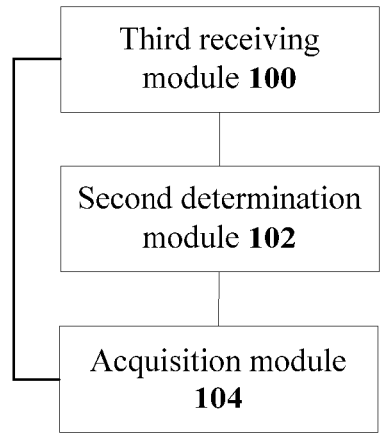
FIG. 10 is a structural block diagram of a device for receiving a multimedia broadcast multicast service according to an embodiment of the disclosure.

The present embodiment also provides a device for receiving a multimedia broadcast multicast service, the device is located in user equipment for realizing the above-mentioned embodiments and preferred implementations, which has been described and will not be repeated, and modules involved in the device are described below. As used below, the term "module" can be the combination of software and/or hardware which can realize the predetermined functions. Although the device described by the following embodiments is preferably achieved by software, but the realization of hardware or the combination of software and hardware is also possible and can be conceived. FIG. 10 is a structural block diagram of a device for receiving a multimedia broadcast multicast service according to an embodiment of the disclosure. As shown in FIG. 10, the device includes:

a receiving module 100 coupled with a determination module 102 and an acquisition module 104 and configured to receive a specified MBMS which is carried in an MBMS over a single frequency network (MBSFN) area to which a source cell where the UE is currently located belongs and continue receiving the specified MBMS according to the condition of one or more MBMSs which are carried in one or more MBSFN areas to which the target cell belongs, which is acquired by the acquisition module 104, wherein the target cell is a cell where UE resides after performing cell reselection;

a determination module 102 coupled with the acquisition module 104 and configured to, after the UE performs cell reselection and resides in the target cell, determine that the one or more MBSFN area to which the target cell belongs are different from one or more MBSFN areas to which the source cell belongs; and the acquisition module 104 configured to, in the case that the above-mentioned determination module 102 determines that the one or more MBSFN areas to which the target cell belongs are different from one or more MBSFN areas to which the source cell belongs, acquire the condition of one or more MBMSs which are carried in the one or more MBSFN areas to which the target cell belongs.

Through the functions realized by the above-mentioned modules, UE continues receiving the specified MBMS service according to the condition of the one or more MBMSs which are carried in one or more MBSFN areas to which the target cell belongs in the case that UE determines that the one or more MBSFN areas to which the target cell belongs are different from one or more MBSFN areas to which the source cell belongs. By virtue of the technical solution in the embodiment, the UE can still keep the continuity of receiving the same service when the UE moves out of the current MBSFN area.

Preferably, the above-mentioned receiving module 100 is also configured to, when the MBMS condition is that the specified MBMS is not carried in any of the one or more MBSFN areas to which the target cell belongs, continue receiving the specified MBMS according to configuration parameters provided by the source cell.

In a preferred implementation of the disclosure, the above-mentioned receiving module 100 is also configured to, when the MBMS condition is that the specified MBMS is carried in part of the MBSFN areas to which the target cell belongs, select one or more MBSFN areas from the above-mentioned part of the MBSFN areas according to a predetermined strategy to continue receiving the specified MBMS.

The above-mentioned receiving module 100 is also configured to, in the condition that there are multiple MBSFN areas to which the source cell belongs to, select one or more MBSFN areas from the multiple MBSFN areas to which the above-mentioned source cell belongs to receive the specified MBMS.

To understand the above-mentioned embodiments better, the particular description is made with reference to the accompanying drawings and embodiments as follows. The main design idea of the following embodiments is described as follows.

When UE tries to receive an MBMS of interest, if the UE is unable to receive the MBMS of interest in the current cell where the UE resides, then the scene is not the researched scenario of the following embodiment, that is to say, the application scenario of the following embodiment is that UE is always supposed to begin to receive the MBMS of interest in at least one MBSFN area of the one or more MBSFN areas to which the current cell belongs. When UE begins to receive the MBMS of interest in the current cell, the MBMS of interest may be received on all of the one or more MBSFNs. The method for UE to begin to receive the service in the source cell can be found in embodiment 1.

After the UE moves to a new cell and the UE resides in the new cell through cell reselection, the method for the UE to continue receiving the service on the new cell in embodiment 2 can be adopted to enable the UE continue receiving the MBMS of interest which is carried in certain/some MBSFNs of the source cell. For the convenience of description, in the embodiment of the disclosure, it is assumed that when UE begins to receive the MBMS of interest, the MBMS of interest can be received in only one MBSFN area of the current cell.

Embodiment 1

The present embodiment provides a method for the UE to begin to receive the MBMS of interest, and also provides a method regarding how UE combines the same MBMS content of multiple MBSFN areas.

In the present embodiment, UE has known in advance the TMGI identity of the MBMS of interest, and the UE resides in a certain cell and begins to receive the MBMS of interest. In the present embodiment, supposed that the cell belongs to one or more MBSFN (overlapped) areas, and the UE can read the MBMS of interest in at least one MBSFN area therein.

If the UE can receive the MBMS of interest on multiple MBSFN areas, then the UE may select one MBSFN therefrom, or may select multiple MBSFNs therefrom to receive the MBMS of interest in this/these MBSFN areas.

If one MBSFN is selected therefrom to receive the MBMS of interest, then the selection manner may be that the UE selects one MBSFN from these MBSFNs at random, and also may be that UE selects one according to the signal strength and the signal quality of one or more MBMSs in these MBSFN areas. The method for selecting multiple MBSFNs therefrom and receiving on these MBSFNs by the UE is similar to that of selecting one MBSFN.

In conclusion, UE resides in one cell, and the cell belongs to one or more MBSFN areas, when the UE begins to receive the MBMS of interest, if the UE can receive the MBMS of interest in multiple MBSFN areas at the same time, then:

1) UE can select one MBSFN area therefrom to receive the MBMS of interest. UE may select one MBSFN therefrom at random or select one MBSFN according to the signal strength and the signal quality of one or more MBMSs in these MBSFN areas, and then the UE receives the MBMS of interest in this MBSFN area.

2) UE selects multiple MBSFN areas therefrom to receive the MBMS of interest. UE may select multiple MBSFNs therefrom at random or select multiple MBSFNs according to the signal strength and the signal quality of one or more MBMSs in these MBSFN areas, and then the UE receives an MBMS of interest on these MBSFN areas. When UE can read the MBMS of interest in multiple MBSFNs, the UE can combine the contents of the MBMS acquired on multiple different MBSFN areas so as to improve the receiving gain. The combining ways can be soft combining, or selective combining, also can be the combination of various combining methods.

Embodiment 2

Figure 11:
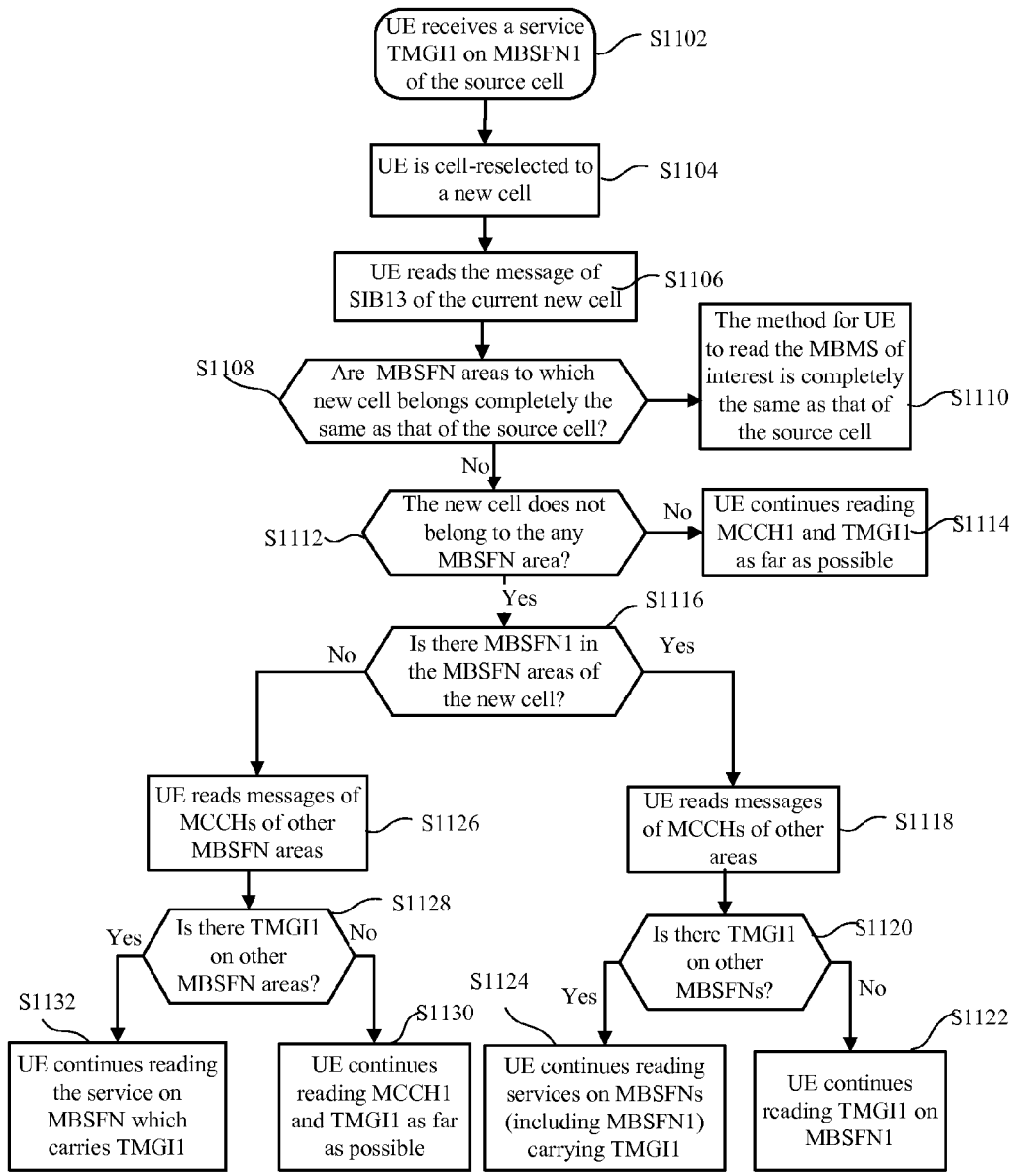
FIG. 11 is a flowchart of UE continuing reading MBMS in a new cell according to an embodiment of the disclosure.

The present embodiment provides a method for UE which is receiving the MBMS of interest in a certain cell (the source cell) to continue receiving the MBMS after residing in a target cell through cell reselection (as shown in FIG. 11). FIG. 11 is a flowchart of UE continuing reading MBMS in a new cell according to an embodiment of the disclosure, as shown in FIG. 11, the present embodiment also provides a method as regards how UE combines the content of the same MBMS acquired in multiple MBSFN areas.

To achieve the above-mentioned objective, the present embodiment adopts the following technical solutions.

Step S1102, UE receives service TMGI1 in MBSFN1 of the source cell.

Step S1104, UE is cell-reselected to a new cell.

Step S1106, UE reads the message of SIB13 of the current new cell.

Step S1108, it is compared whether one or more MBSFN areas to which the new cell belongs are completely the same as that to which the source cell belongs; if yes, then turns to Step S1110, otherwise turns to Step S1112.

Step S1110, if the source cell and the new cell both belong to the completely same MBSFN overlapped area or areas, then the method for the UE to read the MBMS of interest is completely the same as that of the source cell. That is, the UE still reads the MBMS of interest on the same one or more MBMS areas, and the flow ends.

Step S1112, if the source cell and the new cell belong to the MBSFN overlapped areas which are not completely the same, it is judged whether an SIB13 area is configured for the new cell, that is, it is judged whether the new cell does not belong to any MBSFN area, if the new cell does not belong to any MBSFN area, turns to Step S1114, otherwise turns to Step S1116.

Step S1114, if no SIB13 message is configured for the new cell, then it means that the UE moves out of all the MBSFN areas, then UE continues reading MCCH messages and continues reading the MBMS of interest on configuration resources of MCCH that the source cell indicates as far as possible, and the follow ends.

Step S1116, it is judged that whether the MBSFN area for carrying the MBMS being received is included in the one or more MBSFN (overlapped) areas to which the cell belong indicated in the SIB13 message in the new cell, if yes, turns to Step S1118; otherwise, turns to Step S1126.

Step S1118, UE needs to further read MCCH messages of other areas, and turns to Step S1120.

Step S1120, it is judged that whether the new MBSFN area carries the MBMS which was being read originally, that is, it is judged whether there is TMGI1 on other MBSFNs, if yes, turns to Step S1124, otherwise, turns to Step S1122.

Step S1122, if the MBMS which was being read originally cannot be carried in any of the MBSFN areas of the new cell, then UE continues reading MCCH messages and continues reading the MBMS of interest on the MCCH configuration resource indicated by the source cell as far as possible.

Step S1124, if the MBMS which was being received originally can be carried in one or more MBSFN areas of all the MBSFN areas of the new cell, then UE can read the MBMS which was being received originally on at least one MBSFN area in this/these MBSFN areas.

When the MBMS which was being received originally can be carried in multiple MBSFN areas in the new cell, then UE can select to receive the MBMS which was being received originally carried in one or more MBSFN areas.

The method for UE to select one MBSFN area from the multiple MBSFN areas to receive MBMS may be that UE selects one MBSFN at random, and also may be that UE selects one according to the signal strength and the signal quality of one or more MBMSs on these MBSFN areas. The method for UE to select multiple MBSFNs from these MBSFNs is similar.

At the same time, UE can also continue reading MCCH messages and continue reading the MBMS of interest on configuration resources of MCCH that the source cell indicates as far as possible.

If it is indicated in SIB13 message on the new cell that the MBSFN area carrying the MBMS which is being received is included in the one or more MBSFN (overlapped) areas to which the new cell belongs, then the UE can not only continue receiving the MBMS on the original MBSFN area, at the same time, the UE also can determine that whether the MBMS which was being read originally can be carried in one or more new MBSFN areas by further reading MCCH messages of other areas. Therefore, the method may further include:

if the MBMS which was being read originally cannot be carried in any of the MBSFN areas of the new cell, then UE continues receiving MBMS on the original MBSFN area.

If the MBSFN areas of the new cell include not only the MBSFN which is the same as the original area, but also one or more other MBSFN areas which can carry the MBMS which was being received originally, then the UE can read the MBMS which was being received originally on at least one MBSFN area of this/these MBSFN areas.

When multiple MBSFN areas in the new cell (including the MBSFN which is the same as that of the source cell) can carry the MBMS which was being received originally, then the UE can select one MBSFN therefrom, also can select multiple MBSFNs therefrom to receive the MBMS which was being received originally.

If one MBSFN of these MBSFN areas is selected to receive the MBMS which was being received originally, then under general cases, for convenience, UE will receive the MBMS which was being received originally on the MBSFN which is the same as that of the source cell. However, the method that the UE selects one MBSFN area from all the multiple MBSFN areas (including the original MBSFN) to receive MBMS is also allowed. Further, the selection method may be that UE selects one MBSFN therefrom at random, and also may be that UE selects one according to the signal strength and the signal quality of one or more MBMSs on these MBSFN areas.

UE also can select multiple MBSFNs therefrom and receive on these MBSFNs, the method is that UE selects multiple MBSFN areas therefrom to receive the MBMS of interest. UE can select multiple MBSFNs therefrom at random, and also may be that UE selects multiple MBSFNs according to the signal strength and the signal quality of one or more MBMSs on these MBSFN areas, then the UE receives the MBMS of interest on these MBSFN areas. When the UE can read the MBMS of interest from multiple MBSFN areas, the UE can combine the contents of the MBMS obtained from multiple different MBSFN areas to improve the receiving gain. The combining ways can be soft combining or selective combining, and also can be the combination of various combining methods.

In this embodiment, for the convenience of the description of the particular embodiments, UE knows in advance the TMGI of the MBMS of interest which is assumed to be TMGI1, and the UE resides in a certain cell (assuming the source cell is cell1) to find and read the content of TMGI1 (the MBMS of interest). Specifically speaking, 1) UE knows in advance that the MBMS of interest is identified as TMGI1; 2) the UE reads SIB13 at first; 3) then the UE finds several pieces of MCCH configuration information and reads the MCCHs, and it is found that TMGI1 is carried in the MBSFN1 corresponding to the MCCH1; and 4) whereafter, the UE reads the content of TMGI1 on the MTCH, and at this moment, the UE still monitors SIB13 and reads the content of MCCH1.

When the UE reselects from the source cell (cell1) to a new cell (assuming the new cell is cell2) through cell reselection, the UE reads SIB13 in cell2 and learns which MCCH(s) the cell2 is configured on so as to know which MBSFN area(s) cell2 belongs to. There will be three results:

it is possible that the cell2 has no SIB13, for such case, the cell does not belong to any MBSFN area;

the cell has SIB13 but does not has configuration information of MCCH1, then this cell does not belong to the area covered by MCCH1; and the cell has SIB13 and configuration information of MCCH1.

In embodiments 3, 4 and 5 described below, the above-mentioned three results and the method for UE to keep service continuity are introduced in detail.

Step S1126, UE reads the messages of MCCHs of other MBSFN areas, and turns to Step S1128.

Step S1128, it is judged whether there is TMGI1 on other MBSFN areas, if yes, then turns to Step S1132, otherwise, turns to Step S1130.

Step S1130, UE continues reading MCCH1 and TMGI1 as far as possible.

Step S1132, UE continues reading the service on MBSFN which carries TMGI1.

Embodiment 3

Figure 12:
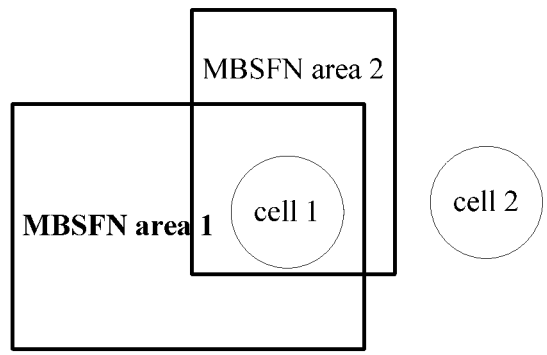
FIG. 12 is a schematic diagram of UE moving out of the MBSFN area according to an embodiment of the disclosure.

If the result 1) in embodiment 2 appears, that is, the cell2 has no SIB13, in such case, the cell does not belong to any MBSFN area, that is to say, the UE moves out of the area covered by any MBSFN (including MBSFN1). Under this circumstance, UE is unable to read SIB13 of cell2 and is thus also unable to obtain any configuration information of MCCH (including MCCH1), then the UE is unable to obtain any MCCH, including configuration information of \MCCH1. FIG. 12 is a schematic diagram of UE moving out of the MBSFN area according to an embodiment of the disclosure, particularly as shown in FIG. 12.

In this embodiment, UE moves out of the coverage area of the MBSFN. At this moment, the UE resides in a new cell cell 2 from the source cell cell1 through cell reselection, the UE is unable to read SIB13 and thus is unable to obtain the configuration information of any MCCH. According to the fact that whether UE can continue reading MCCH1 and MTCH1 in cell2, this embodiment is further divided into two scenes.

1-1) In cell2, UE can read the contents of MCCH1 and MTCH1.

1-2) In cell 2, the UE cannot read the contents of MCCH1 and MTCH1.

The result 1-1) appears because although cell2 does not belong to the coverage area of MBSFN1, due to the gain of the MBSFN macro diversity of MBSFN1, the signals of MCCH1 and MTCH1 of MBSFN1 are very strong and exceed the coverage area of cell1 and extend to the coverage area of cell2. The appearance of such result also needs that the configuration parameters of the MCCH1 are not changed (that is, the configuration parameters of MCCH1 being not updated as regards on SIB13). Since UE can read MCCH1 correctly, then the UE can read MTCH1 and read the content of TMGI1 correctly, which is represented as that the service is still continuous.

If the result 1-2) appears, since the UE cannot read MCCH1 correctly, then the UE cannot read the content of TMGI1 correctly, which is represented as that the service is discontinued. The reason for the appearance of this result is possibly that UE is far away from the coverage area of MBSFN1, the UE cannot read and receive the content of MCCH1 correctly, resulting in that the UE cannot read MCCH1 (cannot read TMGI1). The reason for the appearance of this result is also possibly that the configuration parameters of the MCCH1 have been changed, since the UE cannot read the configuration information of the MCCH1 in SIB13 on cell1, the UE does not know the new configuration parameters of the MCCH1, which results in that the content of MCCH1 and the content of MTCH1/TMGI1 are not able to be read.

Figure 13:
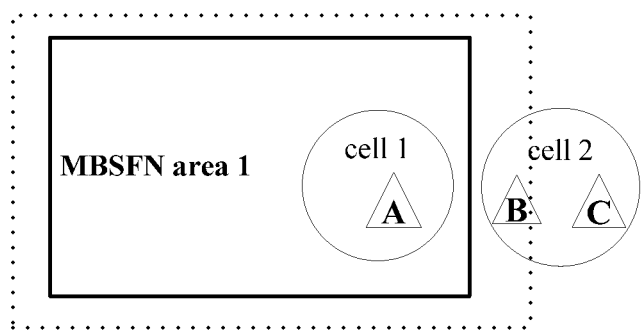
FIG. 13 is a schematic diagram of UE continuing receiving the service as far as possible in a non-MBSFN area according to an embodiment of the disclosure.

With UE moving and cell-reselecting from cell1 to cell2, supposed that the configuration parameters of MCCH1 are not changed (the configuration parameters of MCCH in SIB13 are not changed usually), the UE moves from cell1 to cell2 and moves from the boundary area of cell2 to the central zone of cell2, FIG. 13 is a schematic diagram of UE continuing receiving the service as far as possible in a non-MBSFN area according to an embodiment of the disclosure, as shown in FIG. 13, UE moves from a point A of cell1 in FIG. 6 to a point B firstly (reselected to cell2) and then moves to a point C (from the boundary of cell2 to the centre), generally 1-1) will appear firstly, then 1-2) appears, in this process, the UE reads MCCH1 and MTCH1 as far as possible so as to continue reading the service of interest to keep the service continuity of this service.

After the UE leaves the source cell and cell-reselected to the target cell, when MCCH 1 configuration parameters (i.e., the MCCH configuration information corresponding to the MBSFN to which the predetermined MBMS which the UE is interested in or is being received belongs) are not included in the system broadcast message which is read by the UE on the target cell, but the UE can still read the contents of MCCH 1 and MTCH 1 (that is to say, UE can still read the original MCCH 1 and MTCH 1 on the target cell), at the moment, the UE sends indication information to the network side, the indication information notifies the network side that the UE has moved out of certain/some MBSFN areas, and/or notifies the network side certain/some services that the UE is interested in or is receiving.

In this way, the network side can know that the UE has moved out of the above-mentioned MBSFN areas, and/or that the UE will be unable to continue obtaining certain/some services that the UE is interested in or is receiving, so that a new bearer needs to be established for the UE as soon as possible so as to transmit the above-mentioned service to the UE through the new bearer, thereby keeping the service continuity of the service.

In conclusion, after being reselected to the target cell, if the configuration information of the MCCH corresponding to the above-mentioned service is unable to be read on a system broadcast message of the target cell, the UE which is interested in or is receiving certain/some MBMS services, on one hand, continues to read the MCCH and the MTCH corresponding to the above-mentioned service as far as possible, on another hand, notifies the network side that the UE will be unable to obtain the above-mentioned service; after receiving the notification information sent by the UE, the network side establishes a new bearer for the UE as soon as possible so as to transmit the above-mentioned service to the UE through a the new bearer, thereby keeping the service continuity of the service.

As for the UE side, the above functions can be achieved by the following modules:

a receiving module, configured to receive the system broadcast message of the target cell and continue receiving the MBMS services deployed on the original MBSFN;

a judgement module, configured to judge that the UE has gone out of the original MBSFN area under the condition that the configuration parameter of the original MBSFN area is not included in the system broadcast message which is received on the target cell; and an indication module, configured to report to the network side that the UE has left the original MBSFN area; and/or report to the network side the MBMS service the UE hopes to continue receiving; and/or report to the network side that the UE hopes to establish a new bearer with the network side.

With the above processing in the embodiment, after leaving the original MBSFN area, the UE can continue receiving the original service outside the original MBSFN area by using the characteristic that the signals of the MCCH and the MTCH sent in the MBSFN mode are very strong; moreover, on one aspect, the UE continues receiving the original service outside the original MBSFN area, and on another aspect, the UE notifies the network side to establish a new bearer, thereby guaranteeing the service continuity to the greatest extent.

Embodiment 4

Figure 14:
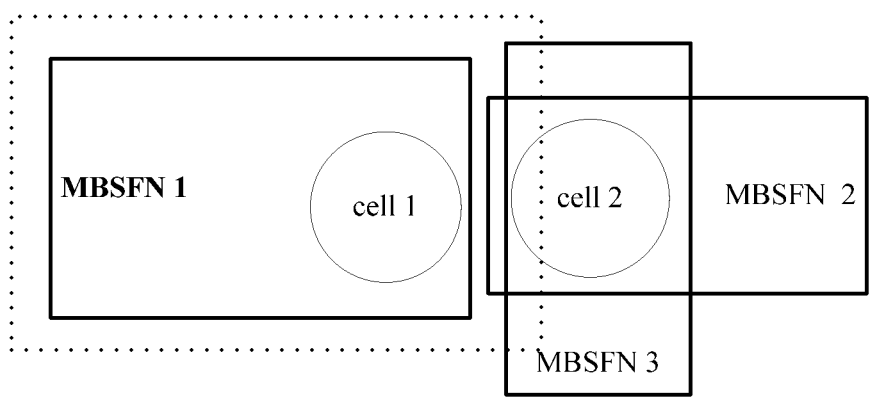
FIG. 14 is a schematic diagram of UE continuing receiving the service after moving out of the original MBSFN area and entering a new MBSFN area according to an embodiment of the disclosure.

If the result 2) appears, although the cell has SIB13 but does not have configuration information of MCCH1, this cell does not belong to the area covered by MBSFN1, then UE is still unable to obtain the configuration information of MCCH1 by reading SIB13; however, the UE can obtain the configuration information of other MCCHs by reading SIB13. FIG. 14 is a schematic diagram of UE continuing receiving the service after moving out of the original MBSFN area and entering a new MBSFN area according to an embodiment of the disclosure, specifically as shown in FIG. 14.

For MBSFN1, the scene of this embodiment also belongs to a scene of UE moving out of the MBSFN area, what is different from embodiment 2 is that in cell 2, UE can read relevant information of other MBSFN areas, the UE moves out of the MBSFN1 and enters other MBSFN areas at the same time. Under such case, on the one hand, the method for UE to receive and process MCCH1 is the same as the result scene 1), on the other hand, the UE can read configuration information of other MCCHs by reading SIB13 and can read the contents of other MCCHs, and the UE can obtain different results according to the contents of this/these MCCHs:

2-1) according to the contents of other MCCHs, TMGI1 is not carried in any of the corresponding MBSFNs, under such case, the act and processing result of UE is completely the same as embodiment 3;

2-2) according to the contents of other MCCHs, TMGI1 is carried in one or more MCCHs, that is, TMGI1 is carried in one or more MBSFNs (it is not MBSFN1), it is assumed to represent as: there is TMGI1 on MBSFN2 corresponding to MCCH2, it is also possible that TMGI1 is carried in MBSFN3/4/ . . . corresponding to MCCH3/4/ . . . at the same time. The act of UE in this scene is introduced below in detail.

In scene 2-2), the new cell cell2 in which the UE resides belongs to multiple other MBSFN areas (such as MBSFN2/3/4/ . . . , but MBSFN1 is not included). In multiple MBSFN overlapped coverage areas to which cell2 belongs, for example, UE can obtain the content of TMGI1 from one or more MBSFN areas of MBSFN2/3/4/5 areas (such as MBSFN2 and/or MBSFN4). The specific method is that UE reads SIB13 of cell2, if cell2 belongs to an overlapped coverage area of MBSFN2/3/4/5, the configuration information of MCCH2/3/4/5 corresponding to these four areas one to one can be read, then the UE reads each MCCH message on radio resources corresponding to each MCCH so as to know that the configuration and scheduling information of MTCH1 (corresponding to TMGI1) are respectively indicated on MCCH2 and MCCH4, and finally, the UE reads MTCH1 (that is, the content of TMGI) on the radio resource indicated by MCCH2 and MCCH4.

On the other hand, UE can read MCCH1 on cell2, that is, the UE can read, on cell 2, both TMGI 1 which is carried in other MBSFNs and also may read TMGI1 which is carried in the MBSFN1. UE can adopt a combining method (such as soft combining, or selective combining) to combine the contents of multiple TMGI1 acquired from different MBSFN areas (MBSFN1 can also be included) so as to improve the receiving gain.

Embodiment 5

Figure 15:
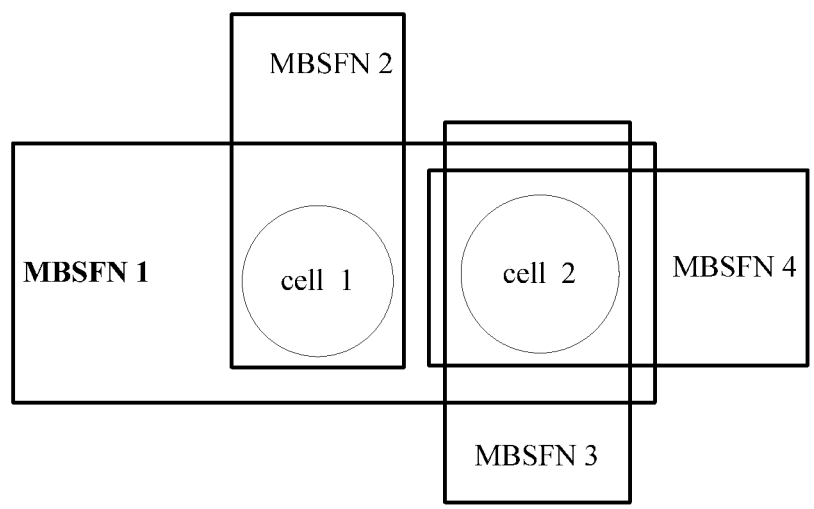
FIG. 15 is a schematic diagram of UE continuing receiving the service after entering a new MBSFN area but not moving out of the original MBSFN area according to an embodiment of the disclosure.

If the result 3) appears, then the cell has SIB13 and configuration information of MCCH1, it means that although UE is reselected from cell1 to cell2, the new cell cell2 and the cell 1 still belong to the same one MBSFN1 area, and therefore, the switch belongs to the intra-MBSFN area switch with regard to the MBSFN1. However, except MBSFN1, other MBSFN areas of cell1 and cell 2 are different, and with regard to other MBSFN areas (except MBSFN1), the case belongs to moving out of one or more MBSFN areas and entering one or more new MBSFN areas. FIG. 15 is a schematic diagram of UE continuing receiving the service after entering a new MBSFN area but not moving out of the original MBSFN area according to an embodiment of the disclosure, as shown in FIG. 15, in cell 2, it still belongs to the coverage area of MBSFN1, which moves out of the coverage area of MBSFN2 but enters the coverage area of MBSFN3 and MBSFN4 at the same time.

After UE performs cell reselection and resides in cell2, the UE reads SIB13 of cell2 so as to obtain the configuration information of several MCCHs, not only the UE can know that cell 2 still belongs to MBSFN1, but also the UE can know which MBSFN area(s) cell2 belongs to, that is, whether the MBSFN areas of cell2 are completely the same as the MBSFN areas of cell1.

Therefore, this embodiment 3 may further include the following two scenes.

3-1) Cell1 and cell2 belong to the completely same MBSFN areas, that is: all the MBSFN areas (MBSFN1/2/3/ . . . ) to which these two cells belong are completely the same; for this scene, after UE reselects from the source cell cell1 to a new cell cell2, the methods for UE to obtain TMGI are completely the same in cell1 and cell2, belonging to the mobility in the same MBSFN area;

3-2) cell1 and cell2 belong to MBSFN areas which are not exactly the same, that is, although cell1 and cell2 both belong to the coverage area of MBSFN1, they belong to at least one of other different MBSFN areas at the same time, it is assumed that MBSFN4/5/ . . . are different areas in this embodiment.

As for scene 3-2), after UE reselects from the source cell cell1 to a new cell cell2, on the one hand, the UE continues receiving TMGI1 which is carried in MBSFN1, at the same time, the UE can read MCCHs corresponding to other different MBSFN areas and find whether they can carry TMGI1, and two different results will appear:

3-2-1) No TMGI1 is indicated on the MCCHs corresponding to other MBSFN areas, then the act of UE to obtain TMGI1 is completely the same as scene 3-1, that is, after the UE reselects from the source cell cell1 to a new cell cell2, the methods for the UE to obtain TMGI are completely the same in cell1 and cell2, belonging to the mobility within the same one MBSFN1 area;

3-2-2) TMGI1 is indicated on at least one MCCH of the MCCHs corresponding to other MBSFN areas, then the UE not only can read TMGI1 which is carried in MBSFN1 corresponding to MCCH1, but also can read TMGI1 which is carried in one or more MBSFNs corresponding to other MCCHs. UE can adopt a combining method (such as soft combining, or selective combining) to combine the contents of multiple TMGI1 acquired from different MBSFN areas (MBSFN1 can also be included) so as to improve the receiving gain.

In conclusion, the adoption of the above-mentioned technical solution of the embodiments of the disclosure is capable of keeping the continuity of an MBMS service when the UE moves among different MBSFNs. After leaving the original MBSFN area, the UE can continue receiving the original service outside the original MBSFN area by using the characteristic that the signals of the MCCH and the MTCH sent in the MBSFN mode are very strong; moreover, on one aspect, the UE continues receiving the original service outside the original MBSFN area, and on another aspect, the UE notifies the network side to establish a new bearer, thereby guaranteeing the service continuity to the greatest extent.

In another embodiment, software is also provided for executing the technical solutions described in the above-mentioned embodiments and preferred implementations.

In another embodiment, a storage medium is also provided, the above-mentioned software is stored in the storage medium, and the storage medium compares but is not limited to disks, floppy disks, rigid disks, erasable storages and so on.

Obviously, those skilled in the art should know that each of the mentioned modules or steps of the disclosure can be realized by universal computing systems; the modules or steps can be focused on single computing device, or distributed on the network formed by multiple computing devices; selectively, they can be realized by the program codes which can be executed by the computing system; thereby, the modules or steps can be stored in the storage system and executed by the computing system; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for sending indication information, comprising:

user equipment (UE) determining that the UE has left one or more multimedia broadcast multicast service over a single frequency network (MBSFN) areas which can carry a specified multimedia broadcast multicast service (MBMS), wherein the specified MBMS is an MBMS which the UE was receiving or was prepared to receive before the UE left the one or more MBSFN areas;

the UE sending indication information to a network side;

after the UE performs cell reselection and resides in a target cell, in the case that the UE determines that one or more MBSFN areas to which the target cell belongs are different from one or more MBSFN areas to which the source cell belongs, the UE acquiring a condition of one or more MBMSs which are carried in the one or more MBSFN areas to which the target cell belongs; and the UE continuing receiving the specified MBMS in the target cell according to the acquired MBMS condition; wherein when the MBMS condition is that the specified MBMS is not carried in any of the one or more MBSFN areas to which the target cell belongs, the UE reuses the configuration parameters provided by the source cell to continue to receive the specified MBMS;

when the MBMS condition is that the specified MBMS is carried in part of the MBSFN areas to which the target cell belongs, the UE selecting one or more MBSFN areas from the part of the MBSFN areas according to a predetermined strategy to continue receiving the specified MBMS.

2. The method according to claim 1, wherein the UE determining that the UE has left the one or more MBSFN areas which can carry the specified MBMS comprises at least one of the following:

after the UE leaves a source cell and resides in a target cell, under the condition that the UE is unable to obtain resource configuration information corresponding to the specified MBMS from a system broadcast message of the target cell, the UE determining that the UE has left the one or more MBSFN areas which can carry the specified MBMS;

under the condition that the UE monitors that a signal quality of the specified MBMS being received is lower than a signal quality threshold, the UE determining that the UE has left the one or more MBSFN areas which can carry the specified MBMS;

under the condition that the UE monitors that a bit error rate of decoding the specified MBMS being received is higher than a bit error rate threshold, the UE determining that the UE has left the one or more MBSFN areas which can carry the specified MBMS.

3. The method according to claim 2, wherein the UE being unable to obtain the resource configuration information corresponding to the specified MBMS from the system broadcast message of the target cell comprises:

the UE being unable to obtain configuration information of any multicast control channel (MCCH) from the system broadcast message of the target cell; or the UE obtaining configuration information of one or more MCCHs from the system broadcast message of the target cell, but none of one or more MBSFN areas corresponding to the one or more MCCHs included in the system broadcast message being capable of carrying the specified MBMS.

4. The method according to claim 2, further comprising: when the UE is unable to obtain the resource configuration information corresponding to the specified MBMS from the system broadcast message of the target cell, according to resource configuration information corresponding to the specified MBMS obtained from a system broadcast message in the source cell before leaving the source cell, the UE continuing receiving or starting to receive the specified MBMS in the target cell.

5. The method according to claim 1, wherein after the UE sends the indication information to the network side, the method further comprises:

the network side establishing a bearer for transmitting the specified MBMS;

the UE continuing receiving or starting to receive the specified MBMS via the established bearer.

6. The method according to claim 1, wherein the UE sends the indication information to the network side to trigger the network side to establish a bearer for the UE to transmit the specified MBMS.

7. The method according to claim 1, wherein the indication information comprises at least one of the following:

a flag for indicating that the UE has left one or more MBSFN areas which can carry the specified MBMS;

one or more identifiers of the one or more MBSFN areas which can carry the specified MBMS;

a server identifier of the specified MBMS;

a request for establishing a bearer for transmitting the specified MBMS.

8. A user equipment (UE), comprising:

a first determination module, configured to determine that the UE has left one or more multimedia broadcast multicast service over a single frequency network (MBSFN) areas which can carry a specified multimedia broadcast multicast service (MBMS), wherein the specified MBMS is an MBMS which the UE was receiving or was prepared to receive before the UE left the one or more MBSFN areas;

an indication module, configured to send indication information to a network side when the first determination module determines that the UE has left the one or more MBSFN areas which can carry the specified MBMS;

after the UE performs cell reselection and resides in a target cell, in the case that the UE determines that one or more MBSFN areas to which the target cell belongs are different from one or more MBSFN areas to which the source cell belongs, the UE further configured to acquire a condition of one or more MBMSs which are carried in the one or more MBSFN areas to which the target cell belongs, and receive the specified MBMS in the target cell according to the acquired MBMS condition; wherein:

when the MBMS condition is that the specified MBMS is not carried in any of the one or more MBSFN areas to which the target cell belongs, the UE reuses the configuration parameters provided by the source cell to continue to receive the specified MBMS;

when the MBMS condition is that the specified MBMS is carried in part of the MBSFN areas to which the target cell belongs, the UE selecting one or more MBSFN areas from the part of the MBSFN areas according to a predetermined strategy to continue receiving the specified MBMS.

9. The UE according to claim 8, wherein the first determination module is configured to:

after the UE leaves a source cell and resides in a target cell, under the condition that the UE is unable to obtain resource configuration information corresponding to the specified MBMS from a system broadcast message of the target cell, determine that the UE has left the one or more MBSFN areas which can carry the specified MBMS; and/or, under the condition that the UE monitors that a signal quality of the specified MBMS being received is lower than a signal quality threshold, determine that the UE has left the one or more MBSFN areas which can carry the specified MBMS; and/or, under the condition that the UE monitors that a bit error rate of decoding the specified MBMS being received is higher than a bit error rate threshold, determine that the UE has left the one or more MBSFN areas which can carry the specified MBMS.

10. The UE according to claim 9, wherein the first determination module is configured to determine that the UE is unable to obtain the resource configuration information corresponding to the specified MBMS from the system broadcast message of the target cell under the following condition:

the UE being unable to obtain configuration information of any multicast control channel (MCCH) from the system broadcast message of the target cell; or the UE obtaining configuration information of one or more MCCHs from the system broadcast message of the target cell, but none of one or more MBSFN areas corresponding to the one or more MCCHs included in the system broadcast message being capable of carrying the specified MBMS.

11. The UE according to claim 9, further comprising:

a first receiving module, configured to, when the first determination module determines that the UE is unable to obtain the resource configuration information corresponding to the specified MBMS from the system broadcast message of the target cell, according to resource configuration information corresponding to the specified MBMS obtained from a system broadcast message in the source cell before leaving the source cell, continue receiving or start to receive the specified MBMS in the target cell.

12. The UE according to claim 11, wherein the indication module is configured to send the indication information to the network side under the condition that the UE can read MCCH and MBMS channel (MTCH) corresponding to the resource configuration information according to the resource configuration information which corresponds to the specified MBMS and is obtained by the UE from the system broadcast message of the source cell before leaving the source cell.

13. The UE according to claim 11, wherein the first receiving module is further configured to, after the network side establishes a bearer for transmitting the specified MBMS, continue receiving or start to receive the specified MBMS via the established bearer.

14. The UE according to claim 8, wherein the indication module is configured to send the indication information to the network side to trigger the network side to establish a bearer for the UE to transmit the specified MBMS.

15. The UE according to claim 8, wherein the indication information comprises at least one of the following:
   a flag for indicating that the UE has left one or more MBSFN areas which can carry the specified MBMS;
   one or more identifiers of the one or more MBSFN areas which can carry the specified MBMS;
   a server identifier of the specified MBMS;
   a request for establishing a bearer for transmitting the specified MBMS.

16. A method for receiving a multimedia broadcast multicast service (MBMS), comprising:
   user equipment (UE) receiving a specified MBMS which is carried in one or more MBMS over a single frequency network (MBSFN) area to which a source cell where the UE is currently located belongs;
   after the UE performs cell reselection and resides in a target cell, in the case that the UE determines that one or more MBSFN areas to which the target cell belongs are different from one or more MBSFN areas to which the source cell belongs, the UE acquiring a condition of one or more MBMSs which are carried in the one or more MBSFN areas to which the target cell belongs; and
   the UE continuing receiving the specified MBMS in the target cell according to the acquired MBMS condition; wherein:
   when the MBMS condition is that the specified MBMS is not carried in any of the one or more MBSFN areas to which the target cell belongs, the UE reuses the configuration parameters provided by the source cell to continue to receive the specified MBMS;
   when the MBMS condition is that the specified MBMS is carried in part of the MBSFN areas to which the target cell belongs, the UE selecting one or more MBSFN areas from the part of the MBSFN areas according to a predetermined strategy to continue receiving the specified MBMS.

17. The method according to claim 16, wherein the UE selecting one or more MBSFN areas from the part of the MBSFN areas according to the predetermined strategy to continue receiving the specified MBMS comprises:
   the UE preferentially selecting one or more MBSFN areas to which the source cell belongs from the part of the MBSFN areas to continue receiving the specified MBMS.

18. The method according to claim 16, wherein the predetermined strategy comprises one of the following:
   selecting one or more MBSFN areas at random from the part of the MBSFN areas; and
   selecting one or more MBSFN areas according to signal quality of one or more MBMSs carried in each MBSFN area in the part of the MBSFN areas.

19. The method according to claim 16, wherein there are multiple MBSFN areas to which the source cell belongs, and the UE receiving the specified MBMS which is carried in the one or more MBSFN areas to which the source cell where the UE is currently located belongs comprises:
   the UE selecting one or more MBSFN areas from the multiple MBSFN areas to which the source cell belongs to receive the specified MBMS.

* * * * *